United States Patent
Noguchi et al.

(10) Patent No.: US 10,817,100 B2
(45) Date of Patent: Oct. 27, 2020

(54) DETECTION DEVICE, DISPLAY DEVICE, AND ELECTRONIC APPARATUS

(71) Applicant: Japan Display Inc., Tokyo (JP)

(72) Inventors: Koji Noguchi, Tokyo (JP); Tadayoshi Katsuta, Tokyo (JP); Yasuyuki Teranishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/563,247

(22) Filed: Sep. 6, 2019

(65) Prior Publication Data

US 2019/0391699 A1 Dec. 26, 2019

Related U.S. Application Data

(63) Continuation of application No. 15/357,666, filed on Nov. 21, 2016, now Pat. No. 10,429,981.

(30) Foreign Application Priority Data

Mar. 9, 2016 (JP) ................................. 2016-045844

(51) Int. Cl.
| | | |
|---|---|---|
| *G06F 3/041* | (2006.01) | |
| *G06F 3/044* | (2006.01) | |
| *G02F 1/1333* | (2006.01) | |
| *G02F 1/1343* | (2006.01) | |
| *G02F 1/1335* | (2006.01) |  |

(Continued)

(52) U.S. Cl.
CPC ........ *G06F 3/0414* (2013.01); *G02F 1/13338* (2013.01); *G02F 1/134336* (2013.01);
(Continued)

(58) Field of Classification Search
CPC ..... G06F 3/02; G06F 3/14; G06F 3/36; G06F 3/041; G06F 3/043; G06F 3/044;
(Continued)

(56) References Cited

U.S. PATENT DOCUMENTS

| | | |
|---|---|---|
| 2010/0182273 A1 | 7/2010 | Noguchi et al. |
| 2011/0115738 A1 | 5/2011 | Suzuki et al. |
| (Continued) | | |

FOREIGN PATENT DOCUMENTS

| | | |
|---|---|---|
| CN | 101681221 | 8/2012 |
| CN | 103853409 | 6/2014 |
| (Continued) | | |

OTHER PUBLICATIONS

Office Action issued in related Chinese Patent Application No. 201710019595.9 dated Aug. 28, 2019 and English translation of same.

*Primary Examiner* — Chanh D Nguyen
*Assistant Examiner* — Nguyen H Truong
(74) *Attorney, Agent, or Firm* — K&L Gates LLP

(57) ABSTRACT

A detection device includes a substrate, first electrodes, second electrodes, and a conductor. The substrate has a first surface and a second surface opposite to the first surface. The first electrodes are provided in a display area of the substrate and detect the position of an object being in contact with or in proximity to the first surface side of the substrate or pressure of the object being in contact with the first surface side. The second electrodes are provided along at least one side of the outer periphery of the display area. The conductor is provided on the second surface side of the substrate apart from the substrate and generates an electrostatic capacitor between the conductor and the second electrodes.

19 Claims, 22 Drawing Sheets

(51) Int. Cl.
*G02F 1/1362* (2006.01)
*G02F 1/1368* (2006.01)

(52) U.S. Cl.
CPC ............ *G06F 3/044* (2013.01); *G06F 3/0412* (2013.01); *G06F 3/0416* (2013.01); *G02F 1/1368* (2013.01); *G02F 1/133305* (2013.01); *G02F 1/133308* (2013.01); *G02F 1/133345* (2013.01); *G02F 1/133514* (2013.01); *G02F 1/136286* (2013.01); *G02F 2001/133314* (2013.01); *G02F 2001/133331* (2013.01); *G02F 2001/134345* (2013.01); *G02F 2201/121* (2013.01); *G02F 2201/123* (2013.01); *G06F 2203/04101* (2013.01); *G06F 2203/04102* (2013.01); *G06F 2203/04107* (2013.01); *G06F 2203/04108* (2013.01); *G06F 2203/04111* (2013.01); *G06F 2203/04112* (2013.01)

(58) Field of Classification Search
CPC ........ G06F 3/045; G06F 3/047; G06F 3/0488; G09G 5/00; G09G 5/18; G09G 3/36; G02F 1/133; G02F 1/1333; G02F 1/1343; G02F 1/1335; G02F 1/1362
See application file for complete search history.

(56) References Cited

U.S. PATENT DOCUMENTS

| | | |
|---|---|---|
| 2012/0062511 A1 | 3/2012 | Ishizaki et al. |
| 2012/0098782 A1 | 4/2012 | Nam |
| 2012/0242597 A1* | 9/2012 | Hwang ................. G06F 3/0412 345/173 |
| 2014/0043288 A1 | 2/2014 | Kurasawa et al. |
| 2014/0152616 A1 | 6/2014 | Kida et al. |
| 2014/0292718 A1 | 10/2014 | Noguchi et al. |
| 2014/0333579 A1 | 11/2014 | Sleeman et al. |
| 2015/0130770 A1 | 5/2015 | Takatori |
| 2015/0355771 A1 | 12/2015 | Watazu et al. |
| 2016/0062500 A1* | 3/2016 | Kessler ................. G06F 3/0414 345/174 |
| 2016/0092015 A1* | 3/2016 | Al-Dahle ................. G06F 3/044 345/174 |
| 2016/0098109 A1 | 4/2016 | Choi et al. |
| 2016/0098110 A1* | 4/2016 | Choi ..................... G06F 3/0416 345/173 |
| 2017/0068368 A1 | 3/2017 | Hsiao et al. |
| 2017/0075493 A1 | 3/2017 | Lee et al. |
| 2017/0090637 A1 | 3/2017 | Yoon et al. |
| 2017/0168641 A1* | 6/2017 | Cheng .................. G06F 3/044 |
| 2017/0205924 A1* | 7/2017 | Kim ...................... G06F 3/0412 |
| 2017/0220181 A1 | 8/2017 | Li et al. |
| 2017/0220183 A1* | 8/2017 | Kim ..................... G06F 3/0412 |
| 2017/0262125 A1 | 9/2017 | Ding et al. |

FOREIGN PATENT DOCUMENTS

| | | |
|---|---|---|
| CN | 104636013 | 5/2015 |
| CN | 105144043 | 12/2015 |
| JP | 2000-066837 A | 3/2000 |
| JP | 2009-244958 A | 10/2009 |

* cited by examiner

DETECTION DEVICE, DISPLAY DEVICE, AND ELECTRONIC APPARATUS

CROSS-REFERENCE TO RELATED APPLICATIONS

This application is a continuation of U.S. patent application Ser. No. 15/357,666, filed on Nov. 21, 2016, which application claims priority from Japanese Application No. 2016-045844, filed on Mar. 9, 2016, the contents of which are incorporated by reference herein in its entirety.

BACKGROUND

1. Technical Field

The present invention relates to a detection device, a display device, and an electronic apparatus.

2. Description of the Related Art

Touch detection devices that can detect an external proximate object, which are what is called a touch panel, have recently been attracting attention. Touch panels are mounted on or integrated with a display device, such as a liquid crystal display device, to be used as display devices with a touch detection function. Some types of display devices with a touch detection function are known, including display devices provided with a capacitance touch sensor. Japanese Patent Application Laid-open Publication No. 2009-244958 (JP-A-2009-244958) describes a display device with a touch sensor including detection electrodes for a sensor in a frame area of a TFT substrate. The frame area surrounding a display area is provided with a plurality of detection electrodes for a sensor individually separated from one another.

Japanese Patent Application Laid-open Publication No. 2000-66837 (JP-A-2000-66837) describes a pressure detecting digitizer that includes liquid crystal display cells, and gate lines and drain lines provided in mutually intersecting directions. The pressure detecting digitizer disclosed in JP-A-2000-66837 detects pressure applied to a liquid crystal display panel based on capacitance changes of the liquid crystal display cells provided at respective intersections of the gate lines and the drain lines.

In the display device with a touch sensor described in JP-A-2009-244958, the detection electrodes for a sensor are provided as a group of individual electrodes and allocated to operation buttons corresponding to various functions of a display application, for example. JP-A-2009-244958 has no description of pressure detection. When the pressure detecting digitizer disclosed in JP-A-2000-66837 receives input performed at a plurality of positions on the liquid crystal display panel, the pressure detecting digitizer may possibly have difficulty in detecting accurate input positions and magnitude of pressure.

For the foregoing reasons, there is a need for a detection device, a display device, and an electronic apparatus that can accurately detect pressure.

SUMMARY

According to an aspect, a detection device includes a substrate having a first surface and a second surface opposite to the first surface, first electrodes that are provided in a display area of the substrate and that detect a position of an object being in contact with or in proximity to the first surface side of the substrate or pressure of the object being in contact with the first surface side, a plurality of second electrodes provided along at least one side of an outer periphery of the display area, and a conductor that is provided on the second surface side of the substrate apart from the substrate and that generates an electrostatic capacitor between the conductor and the second electrodes.

According to another aspect, display device includes the detection device described above, a plurality of pixel electrodes facing the first electrodes and arranged in a matrix, and a display function layer that performs an image display function in the display area.

According to another aspect, an electronic apparatus includes the detection device described above, and a housing that accommodates the detection device. The housing includes the conductor.

According to another aspect, an electronic apparatus includes the display device described above, and a housing that accommodates the display device. The housing includes the conductor.

DETAILED DESCRIPTION

Figure 1:
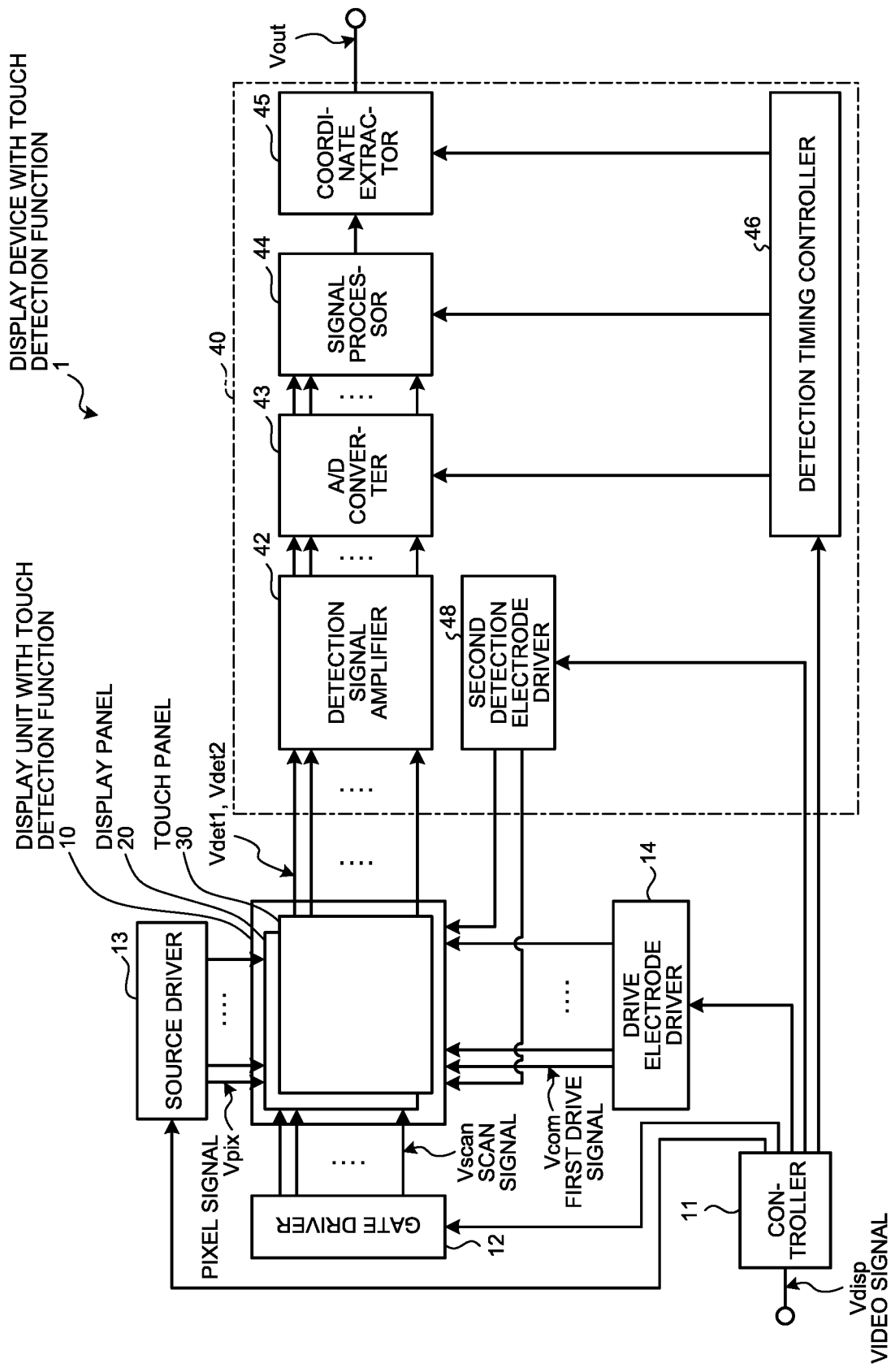
FIG. 1 is a block diagram of an exemplary configuration of a display device with a touch detection function according to a first embodiment.

Embodiments for carrying out the present invention will be described in detail with reference to the drawings. The present invention will not be limited to the description of the embodiments given below. Components described below include those easily conceivable by those skilled in the art, and those substantially the same. Moreover, the components described below can be combined as appropriate. The disclosure is merely an example, and the present invention naturally encompasses an appropriate modification maintaining the gist of the invention, which is easily conceivable by those skilled in the art. To further clarify the description, a width, a thickness, a shape, and the like of each component may be schematically illustrated in the drawings as compared with an actual aspect. However, this is merely an example, and interpretation of the invention is not limited thereto. The same element as that described in the drawing that has already been discussed is denoted by the same reference numeral through the description and the drawings, and detailed description thereof will not be repeated in some cases where appropriate.

First Embodiment

FIG. 1 is a block diagram illustrating a configuration example of a display device with a touch detection function according to a first embodiment. As illustrated in FIG. 1, the display device with a touch detection function 1 includes a display unit with a touch detection function 10, a controller 11, a gate driver 12, a source driver 13, a drive electrode driver 14, and a detector 40. The display device with a touch detection function 1 is a display device in which the display unit with a touch detection function 10 incorporates a touch detection function. The display unit with a touch detection function 10 is a device configured by integrating a display panel 20 using liquid crystal display elements as display elements and a touch panel 30 serving as a detection device for detecting a touch input. The display unit with a touch detection function 10 may be what is called an on-cell device configured by mounting the touch panel 30 on the display panel 20. The display panel 20 may be an organic electroluminescent (EL) display panel.

The display panel 20 is an element that performs display by sequentially scanning one horizontal line at a time according to a scan signal Vscan supplied from the gate driver 12, as will be described later. The controller 11 is a circuit that supplies a control signal to each of the gate driver 12, the source driver 13, the drive electrode driver 14, and the detector 40 based on an externally supplied video signal Vdisp, and thus controls these drivers and the detector so as to operate them in synchronization with one another.

The gate driver 12 has a function to sequentially select one horizontal line to be driven to perform display of the display unit with a touch detection function 10, based on the control signal supplied from the controller 11.

The source driver 13 is a circuit that supplies a pixel signal Vpix to each sub-pixel SPix (described later) of the display unit with a touch detection function 10, based on the control signal supplied from the controller 11.

The drive electrode driver 14 is a circuit that supplies a first drive signal Vcom to a drive electrode COML (described later) of the display unit with a touch detection function 10, based on the control signal supplied from the controller 11.

The touch panel 30 operates based on the basic principle of capacitance touch detection, and performs a touch detection operation using a mutual capacitance method to detect contact or proximity of an external conductor with a display area. The touchscreen 30 may perform the touch detection operation using a self-capacitance method.

The detector 40 is a circuit that detects whether the touch panel 30 is touched, based on the control signal supplied from the controller 11 and a first detection signal Vdet1 supplied from the touch panel 30. When the touch panel 30 is touched, the detector 40 obtains, for example, coordinates of the touch input. The detector 40 includes a detection signal amplifier 42, an analog-to-digital (A/D) converter 43, a signal processor 44, and a coordinate extractor 45. A detection timing controller 46 controls the A/D converter 43, the signal processor 44, and the coordinate extractor 45 so as to operate them in synchronization with one another, based on the control signal supplied from the controller 11.

The detector 40 also includes a second detection electrode driver 48. The second detection electrode driver 48 is a circuit that supplies a second drive signal Vd to a second detection electrode 23 (described later) when pressure applied to the display unit with a touch detection function 10 is detected. The detector 40 detects the pressure applied to the display unit with a touch detection function 10 based on a second detection signal Vdet2 supplied from the second detection electrode 23.

Figure 2:
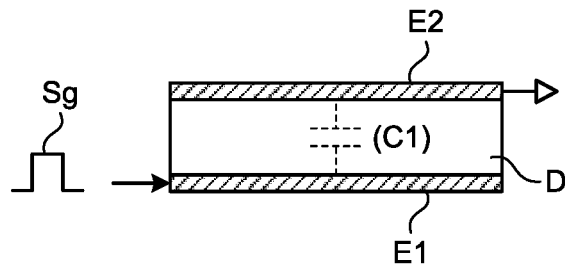
FIG. 2 is an explanatory diagram for explaining a basic principle of mutual capacitance touch detection and illustrates a state where a finger is neither in contact with nor in proximity to a detection electrode.
Figure 3:
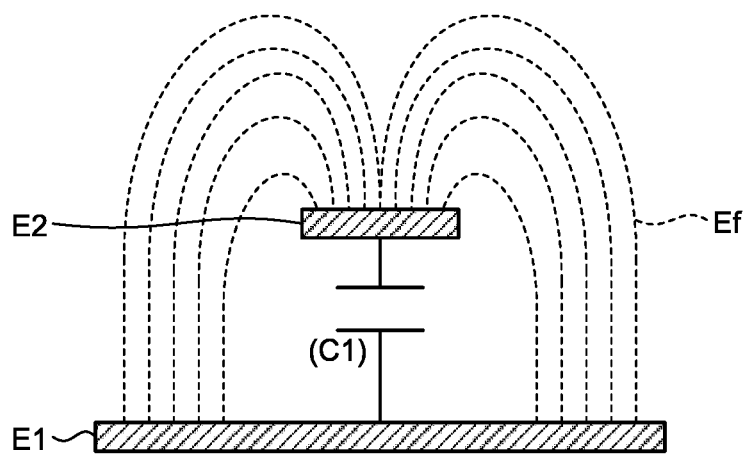
FIG. 3 is an explanatory diagram of an example of a fringing electric field in the state where a finger is neither in contact with nor in proximity to the detection electrode as illustrated in FIG. 2.
Figure 4:
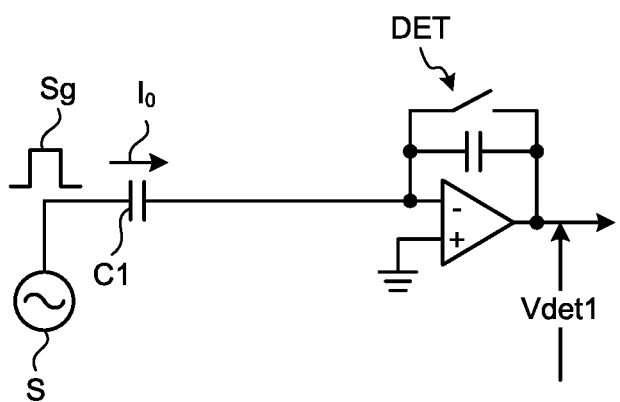
FIG. 4 is an explanatory diagram of an example of an equivalent circuit in the state where a finger is neither in contact with nor in proximity to the detection electrode as illustrated in FIG. 2.
Figure 5:
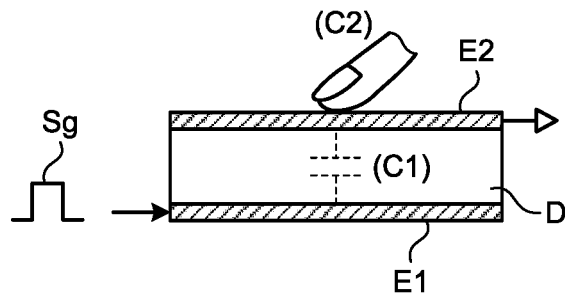
FIG. 5 is an explanatory diagram for explaining the basic principle of mutual capacitance touch detection and illustrates a state where a finger is in contact with or in proximity to the detection electrode.
Figure 6:
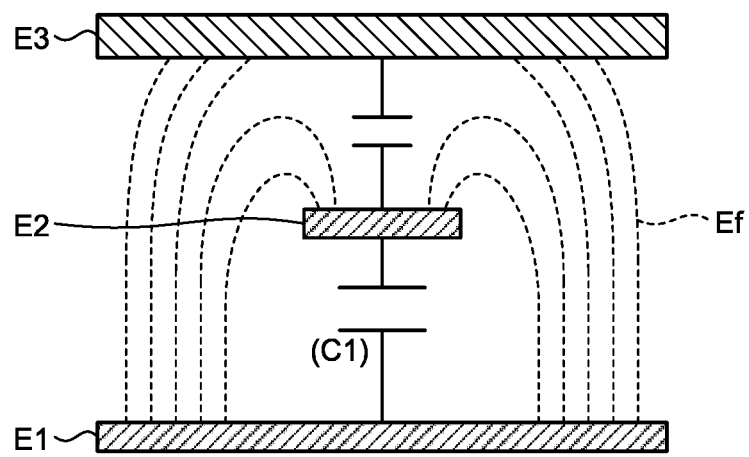
FIG. 6 is an explanatory diagram of an example of a fringing electric field in the state where a finger is in contact with or in proximity to the detection electrode as illustrated in FIG. 5.
Figure 7:
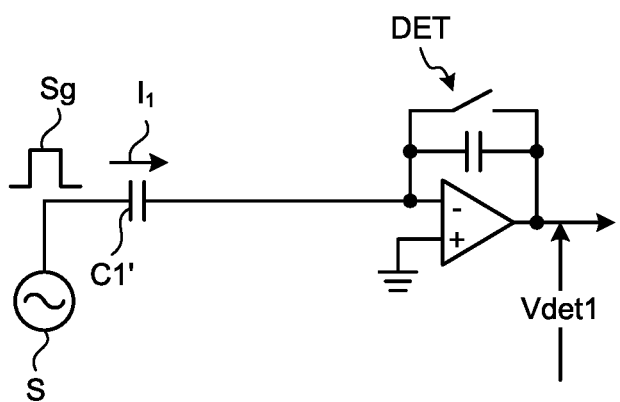
FIG. 7 is an explanatory diagram of an example of the equivalent circuit in the state where a finger is in contact with or in proximity to the detection electrode as illustrated in FIG. 5.
Figure 8:
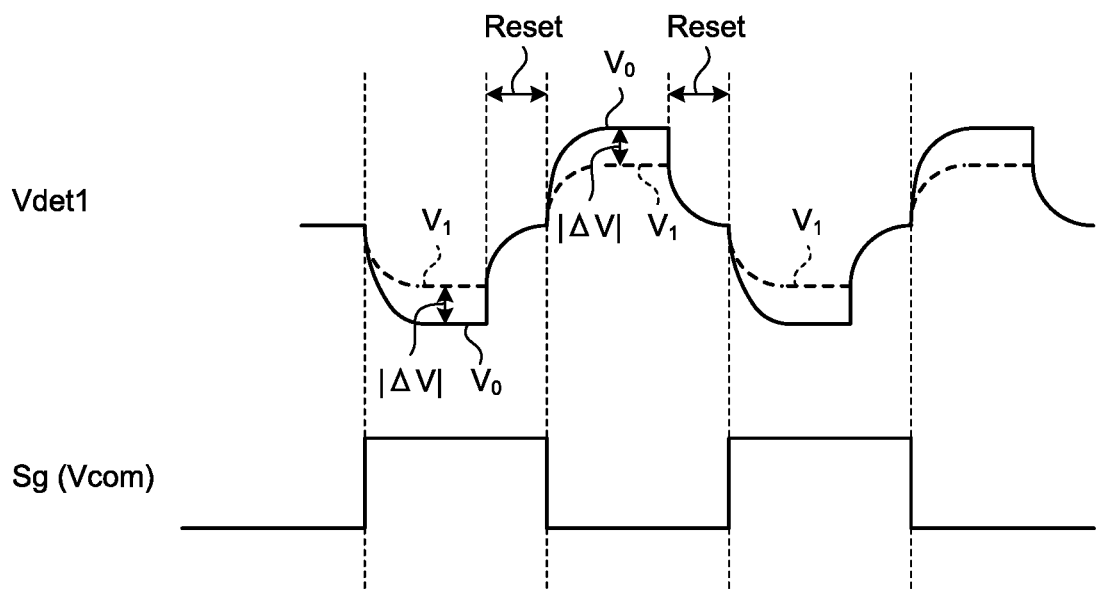
FIG. 8 is a diagram of an example of waveforms of a drive signal and a first detection signal in mutual capacitance touch detection.

As described above, the touch panel 30 operates based on the basic principle of the capacitance touch detection. The following describes the basic principle of the touch detection using the mutual capacitance method performed by the display device with a touch detection function 1 of the present embodiment, with reference to FIGS. 2 to 8. FIG. 2 is an explanatory diagram for explaining the basic principle of the mutual capacitance touch detection, the diagram illustrating a state where a finger is neither in contact with nor in proximity to a detection electrode. FIG. 3 is explanatory diagram illustrating an example of a fringing electric field in the state illustrated in FIG. 2 where the finger is neither in contact with nor in proximity to the detection electrode. FIG. 4 is an explanatory diagram illustrating an example of an equivalent circuit in the state illustrated in FIG. 2 where the finger is neither in contact with nor in proximity to the detection electrode. FIG. 5 is an explanatory diagram for explaining the basic principle of the mutual capacitance touch detection, the diagram illustrating a state where the finger is in contact with or in proximity to the detection electrode. FIG. 6 is explanatory diagram illustrating an example of the fringing electric field in the state illustrated in FIG. 5 where the finger is in contact with or in proximity to the detection electrode. FIG. 7 is an explanatory diagram illustrating an example of the equivalent circuit in the state illustrated in FIG. 5 where the finger is in contact with or in proximity to the detection electrode. FIG. 8 is a diagram illustrating an example of waveforms of the drive signal and the first detection signal. Although the following describes the case where the finger is in contact with or in proximity to the detection electrode, an object being in contact with or in proximity to the detection electrode is not limited to the finger, but, for example, an object including a conductor, such as a stylus pen may be in contact with or in proximity to the detection electrode.

For example, as illustrated in FIG. 2, a capacitive element C1 includes a pair of electrodes, that is, a drive electrode E1 and a detection electrode E2 that are arranged opposite to each other with a dielectric material D interposed therebetween. In the capacitive element C1, lines of electric force (not illustrated) are generated between opposite surfaces of the drive electrode E1 and the detection electrode E2, and in addition, as illustrated in FIG. 3, a fringing electric field Ef that extends from ends of the drive electrode E1 toward the upper surface of the detection electrode E2 is generated. As illustrated in FIG. 4, the capacitive element C1 is coupled, at one end thereof, to an alternating-current signal source (drive signal source) S, and coupled, at the other end thereof, to a voltage detector DET. The voltage detector DET is, for example, an integration circuit included in the detection signal amplifier 42 illustrated in FIG. 1.

Applying an alternating-current rectangular wave Sg having a predetermined frequency (for example, approximately several kHz to several hundred kHz) from the alternating-current signal source S to the drive electrode E1 (one end of the capacitive element C1) causes an output waveform (first detection signal Vdet1) illustrated in FIG. 8 to occur through the voltage detector DET coupled to the detection electrode E2 side (the other end of the capacitive element C1). The alternating-current rectangular wave Sg corresponds to the first drive signal Vcom supplied from the drive electrode driver 14.

In the state (non-contact state) where the finger is neither in contact with nor in proximity to the detection electrode, a current $I_0$ corresponding to the capacitance value of the capacitive element C1 flows in association with charge and discharge of the capacitive element C1, as illustrated in FIG. 4. The voltage detector DET illustrated in FIG. 4 converts a variation in the current $I_0$ corresponding to the alternating-current rectangular wave Sg into a variation in voltage (waveform $V_0$ of a solid line (refer to FIG. 8)).

In the state (contact state) where the finger is in contact with or in proximity to the detection electrode, an electrostatic capacitor C2 generated by the finger is in contact with or in proximity to the detection electrode E2, as illustrated in FIG. 5. This causes a conductor E3 (finger) to shield the fringing electric field Ef located between the drive electrode E1 and the detection electrode E2, as illustrated in FIG. 6. This, in turn, causes the capacitive element C1 to act as a capacitive element C having a smaller capacitance value than that of the non-contact state, as illustrated in FIG. 7. Referring to the equivalent circuit illustrated in FIG. 7, a current $I_1$ flows in the capacitive element C1'. As illustrated in FIG. 8, the voltage detector DET converts a variation in the current $I_1$ corresponding to the alternating-current rectangular wave Sg into a variation in voltage (waveform $V_1$ of a dotted line). In this case, the waveform $V_1$ has a smaller amplitude than the above-mentioned waveform $V_0$. As a result, an absolute value $|\Delta V|$ of a voltage difference between the waveform $V_0$ and the waveform $V_1$ changes according to an influence of the conductor E3, such as the finger, coming into contact with or proximity to the detection electrode from the outside. To accurately detect the absolute value $|\Delta V|$ of the voltage difference between the waveform $V_0$ and the waveform $V_1$, the voltage detector DET preferably performs an operation including a period RESET during which the charge or discharge of the capacitor is reset by switching in the circuit in accordance with the frequency of the alternating-current rectangular wave Sg.

The touch panel 30 illustrated in FIG. 1 is configured to perform the touch detection using the mutual capacitance method by sequentially scanning one detection block at a time according to the first drive signal Vcom supplied from the drive electrode driver 14.

The touch panel 30 is configured to output the first detection signal Vdet1 from a plurality of first detection electrodes TDL (described later) through the voltage detector DET illustrated in FIG. 4 or 7 on a detection-block-by-detection-block basis. The first detection signal Vdet1 is supplied to the detection signal amplifier 42 of the detector 40.

The detection signal amplifier 42 amplifies the first detection signal Vdet1 supplied from the touch panel 30. The detection signal amplifier 42 may include an analog low-pass filter (LPF), that is, an analog filter passing low-frequency components that removes high-frequency components (noise components) from the first detection signal Vdet1, and outputs the result.

The A/D converter 43 samples each analog signal output from the detection signal amplifier 42 at intervals synchronized with the first drive signal Vcom, and converts the sampled analog signal into a digital signal.

The signal processor 44 includes a digital filter that reduces frequency components (noise components) included in the output signal of the A/D converter 43 other than that of the frequency at which the first drive signal Vcom has been sampled. The signal processor 44 is a logic circuit that detects, based on the output signal of the A/D converter 43, whether the touchscreen 30 is touched. The signal processor 44 performs processing to extract only a difference in detection signal caused by the finger. This signal of difference caused by the finger is obtained as the absolute value $|\Delta V|$ of the difference between the waveform $V_0$ and the waveform $V_1$ described above. The signal processor 44 may perform a calculation of averaging the absolute values $|\Delta V|$ for one detection block to obtain the average value of the absolute values $|\Delta V|$. This allows the signal processor 44 to reduce the influence of the noise. The signal processor 44 compares the detected signal of difference caused by the finger with a predetermined threshold voltage, and, if the signal of difference is lower than the threshold voltage, the signal processor 44 determines that the state is the non-contact state of the external proximate object. The signal processor 44 compares the detected signal of difference caused by the finger with the predetermined threshold voltage, and, if the signal of difference is equal to or higher than the threshold voltage, the signal processor 44 determines that the state is the contact state of the external proximate object. The detector 40 can perform the touch detection in this manner.

The coordinate extractor 45 is a logic circuit that obtains touch panel coordinates of a touch when the touch is detected by the signal processor 44. The coordinate extractor 45 outputs the touch panel coordinates as a detection signal output Vout. As described above, the display device with a touch detection function 1 of the present embodiment can detect the touch panel coordinates of a position of contact or proximity of the conductor, such as the finger, based on the basic principle of the touch detection using the mutual capacitance method.

Figure 9:
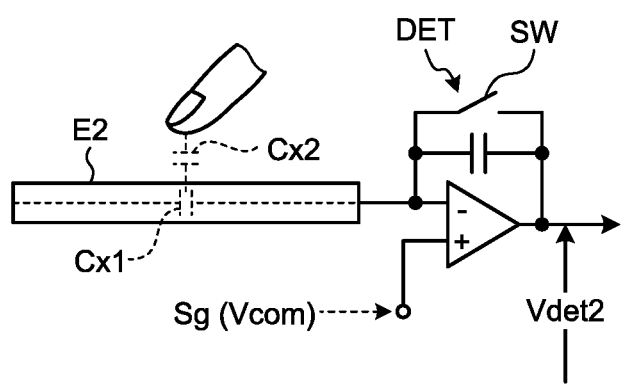
FIG. 9 is an explanatory diagram of an example of the equivalent circuit in self-capacitance touch detection.
Figure 10:
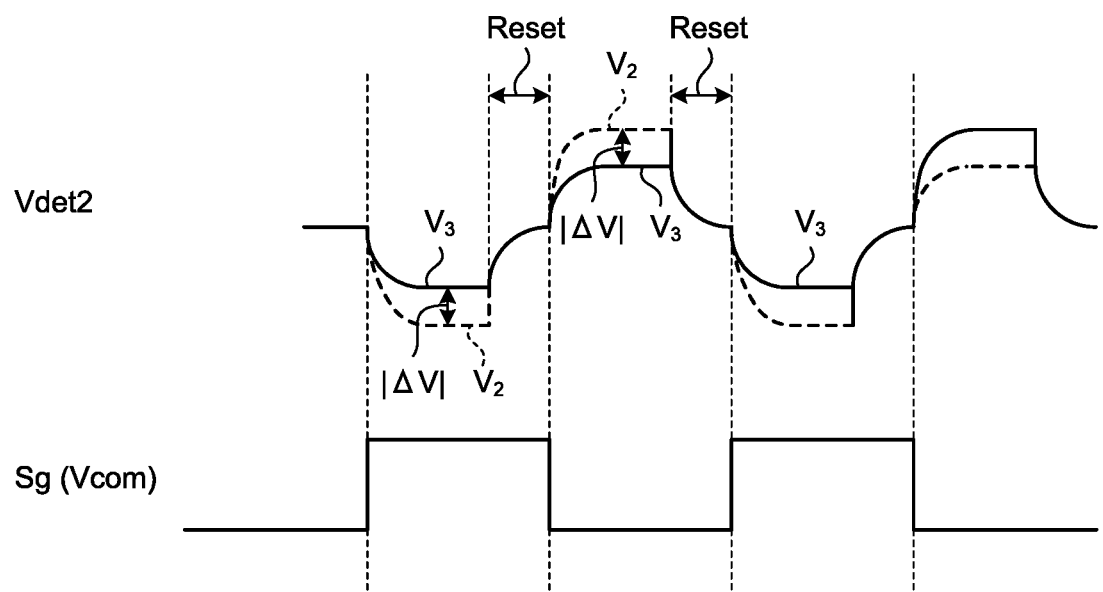
FIG. 10 is a diagram of an example of waveforms of a drive signal and a second detection signal in self-capacitance touch detection.

The following describes the basic principle of the touch detection using the self-capacitance method, with reference to FIGS. 9 and 10. FIG. 9 is an explanatory diagram illustrating an example of an equivalent circuit for the self-capacitance touch detection. FIG. 10 is a diagram illustrating an example of waveforms of the drive signal and the second detection signal of the self-capacitance touch detection.

As illustrated in FIG. 9, the voltage detector DET is coupled to the detection electrode E2. The voltage detector DET is a detection circuit including an imaginarily short-circuited operational amplifier. When the alternating-current rectangular wave Sg having the predetermined frequency (such as approximately several kHz to several hundred kHz) is applied to a non-inverting input part (+), the alternating-current rectangular wave Sg having the same potential is applied to the detection electrode E2.

In the state (non-contact state) where the conductor, such as the finger, is neither in contact with nor in proximity to the detection electrode, a current corresponding to a capacitance Cx1 possessed by the detection electrode E2 flows. The voltage detector DET converts a variation in the current corresponding to the alternating-current rectangular wave Sg into a variation in voltage (waveform $V_3$ of a solid line (refer to FIG. 10)). In the state (contact state) where the conductor, such as the finger, is in contact with or in proximity to the detection electrode, a capacitance Cx2 generated by the finger proximate to the detection electrode E2 is added to the capacitance Cx1 possessed by the detection electrode E2, and a current corresponding to a capacitance (Cx1+Cx2) increased from the capacitance of the non-contact state flows. The voltage detector DET converts the variation in the current corresponding to the alternating-current rectangular wave Sg into a variation in voltage (waveform $V_2$ of a dotted line (refer to FIG. 10)). In this case, the waveform $V_2$ has a larger amplitude than the waveform $V_3$ described above. As a result, the absolute value $|\Delta V|$ of a voltage difference between the waveform $V_2$ and the waveform $V_3$ changes according to the influence of the conductor, such as the finger, coming into contact with or proximity to the detection electrode from the outside. A switch SW is placed in the ON (open) state when the touch detection is performed, and is placed in the OFF (closed) state to perform a reset operation of the voltage detector DET when the touch detection is not performed.

The detection signal amplifier 42 amplifies the second detection signal Vdet2 supplied from the touch panel 30. The A/D converter 43 samples each analog signal output from the detection signal amplifier 42, and converts the sampled analog signal into a digital signal. The signal processor 44 calculates the absolute value $|\Delta V|$ of the difference between the waveform $V_2$ and the waveform $V_3$ based on the signal supplied from the A/D converter 43. The signal processor 44 compares the detected signal of difference (absolute value $|\Delta V|$) caused by the finger with the predetermined threshold voltage, and, if the signal of difference is lower than the threshold voltage, the signal processor 44 determines that the state is the non-contact state of the external proximate object. The signal processor 44 compares the detected signal of difference (absolute value $|\Delta V|$) caused by the finger with the predetermined threshold voltage, and, if the signal of difference is equal to or higher than the threshold voltage, the signal processor 44 determines that the state is the contact state of the external proximate object. The coordinate extractor 45 calculates the touch panel coordinates, and outputs the results as the detection signal output Vout. In this manner, the detector 40 can perform the touch detection based on the basic principle of the self-capacitance touch detection.

The voltage detector DET may be used to perform both the mutual capacitance touch detection and the self-capacitance touch detection. In this case, switching is made such that the non-inverting input part (+) is supplied with a reference voltage having a fixed potential when the mutual capacitance touch detection is performed, and the non-inverting input part (+) is supplied with the alternating-current rectangular wave Sg (first drive signal Vcom) when the self-capacitance touch detection is performed.

The above has described the detection of the external proximate object when the finger is in contact with or in proximity to the detection electrode, using FIGS. 9 and 10. The pressure applied to the input surface can be detected based on the detection principle of the self-capacitance method described above, by providing a conductor facing the detection electrode E2. In this case, the distance between the detection electrode E2 and the conductor changes with the pressure applied to the input surface of the display unit with a touch detection function 10, and the capacitance generated between the detection electrode E2 and the conductor changes. The touchscreen 30 outputs the second detection signal Vdet2 corresponding to this capacitance change to the detection signal amplifier 42. The detection signal amplifier 42, the A/D converter 43, and the signal processor 44 perform the signal processing described above to calculate the absolute value $|\Delta V|$ of the difference between the waveform $V_2$ and the waveform $V_3$. The distance between the detection electrode E2 and the conductor is obtained based on the absolute value $|\Delta V|$. Thereby, the pressure applied to the input surface is calculated. The coordinate extractor 45 calculates the pressure on the input position from a distribution of the pressure applied to the input surface and the touch panel coordinates obtained by the touch detection. The coordinate extractor 45 then outputs the information on the pressure.

Figure 11:
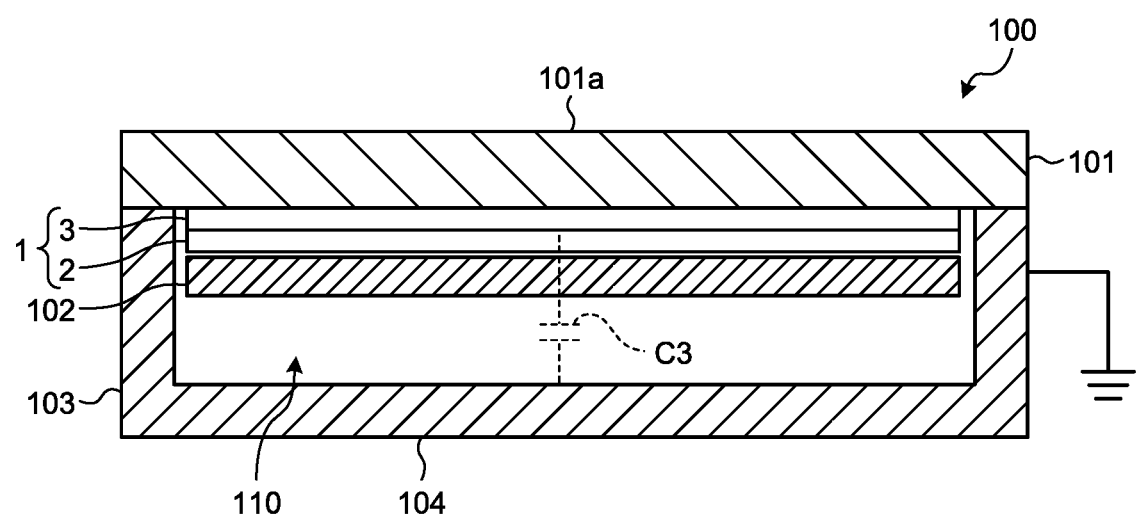
FIG. 11 is a sectional view of a schematic sectional structure of an electronic apparatus including the display device with a touch detection function.

FIG. 11 is a sectional view illustrating a schematic sectional structure of an electronic apparatus including the display device with a touch detection function. An electronic apparatus 100 includes a cover member 101, the display device with a touch detection function 1, a backlight 102, and a housing 103. The cover member 101 is a protective member for protecting the display device with a touch detection function 1, and may be, for example, a light-transmitting glass substrate or a film-like base material containing a resin material or the like. A surface on one side of the cover member 101 serves as an input surface 101a for the finger or the like to perform an input operation by being in contact therewith or in proximity thereto. The display device with a touch detection function 1 includes a pixel substrate 2 (described later) and a counter substrate 3. The counter substrate 3 is provided on the pixel substrate 2, and is disposed on the other side of the cover member 101, that is, on a surface thereof opposite to the input surface 101a.

The backlight 102 is provided on a side of the display device with a touch detection function 1 opposite to the cover member 101. The backlight 102 may be bonded onto the lower surface side of the pixel substrate 2, or may be disposed to the pixel substrate 2 with a predetermined gap provided therebetween. The backlight 102 includes a light source of, for example, light emitting diodes (LEDs), and emits light from the light source toward the pixel substrate 2. The light from the backlight 102 passes through the pixel substrate 2, and switching is performed between a portion shielding the light to prevent it from exiting and a portion allowing the light to exit according to the state of a liquid crystal at each location of the portions so that an image is displayed on the input surface 101a of the cover member 101. The backlight 102 can employ a known illumination unit, and can have various configurations. If the display panel 20 of the display device with a touch detection function 1 is a reflective liquid crystal display device, the backlight 102 need not be provided. In the reflective liquid crystal display device, the pixel substrate 2 is provided with reflective electrodes, and light coming in from the cover member 101 is reflected by the reflective electrodes, and reaches an eye of an observer through the cover member 101. A front light may be provided instead of the backlight 102.

The housing 103 is a box-like member having an opening at an upper portion thereof, and is provided with the cover member 101 so as to cover the opening of the housing 103. An internal space formed by the housing 103 and the cover member 101 incorporates, for example, the display device with a touch detection function 1 and the backlight 102. As illustrated in FIG. 11, the display device with a touch detection function 1 and the backlight 102 are disposed on the cover member 101 side, and a space 110 is provided between the backlight 102 and the bottom of the housing 103. An electrically conductive material, such as a metal, is used for the housing 103, and the bottom of the housing 103 serves as a conductor 104 facing the second detection electrode 23 (not illustrated) of the display device with a touch detection function 1. The housing 103 is electrically coupled to the ground so as to be earthed. The configuration described above generates a capacitance C3 between the second detection electrode 23 (not illustrated) of the display device with a touch detection function 1 and the conductor 104.

When the pressure is applied to the input surface 101a, the pixel substrate 2 and the counter substrate 3 are deformed so as to slightly bend together with the cover member 101 toward the bottom of the housing 103. The display device with a touch detection function 1 detects a change in the capacitance C3 based on the detection principle of the self-capacitance method described above so as to obtain the amount of bend of the cover member 101, the display device with a touch detection function 1, and the backlight 102. Thereby, the pressure applied to the input surface 101a is obtained.

The space 110 between the backlight 102 and the bottom of the housing 103 may be provided with an elastic material, such as sponge or elastic rubber, that is deformable in response to the applied pressure. The housing 103 is not limited to being made of the electrically conductive material, such as a metal, but may be made of an insulating material such as a resin. In this case, at least the bottom of the housing 103 may be provided with a metal layer so as to form the conductor 104.

Figure 12:
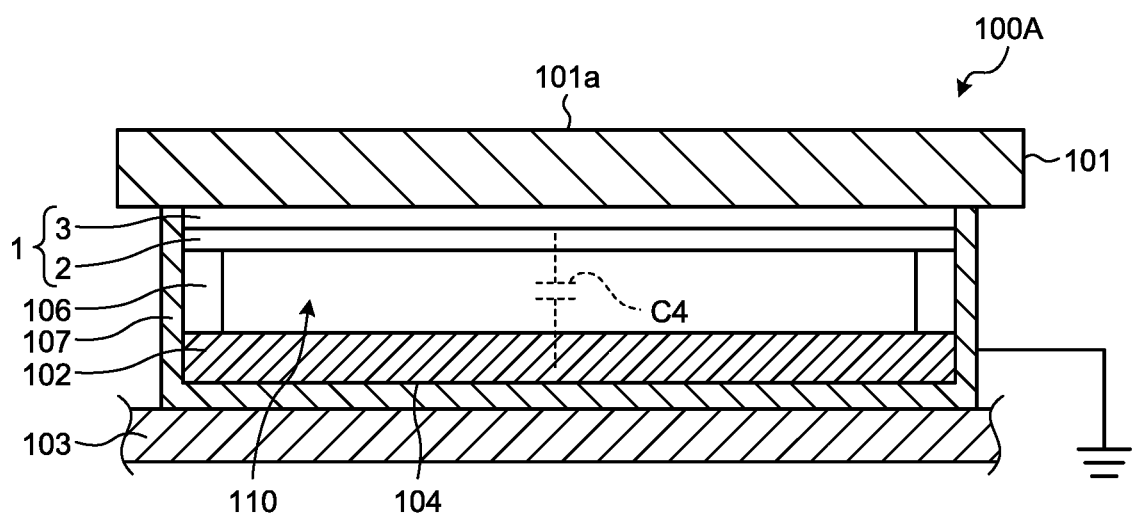
FIG. 12 is a sectional view of a schematic sectional structure of the electronic apparatus according to a first modification.

FIG. 12 is a sectional view of a schematic sectional structure of the electronic apparatus according to a first modification. The present modification includes a display device housing 107. The cover member 101 is provided so as to cover the opening of the display device housing 107. The display device with a touch detection function 1 and the backlight 102 are accommodated in the internal space formed by the display device housing 107 and the cover member 101. The display device with a touch detection function 1 is provided on the surface of the cover member 101 opposite to the input surface 101a. The backlight 102 is provided on the bottom of the display device housing 107. A spacer 106 is provided between the display device with a touch detection function 1 and the backlight 102 to form the space 110 between the display device with a touch detection function 1 and the backlight 102. The display device housing 107 is fixed to the housing 103 of an electronic apparatus 100A. With this configuration, the display device housing 107, the cover member 101, the display device with a touch detection function 1, and the backlight 102 are integrally included in the electronic apparatus 100A.

The display device housing 107 according to the present modification is made of an electrically conductive material, such as a metal. With this structure, the bottom of the display device housing 107 functions as the conductor 104. The display device housing 107 is electrically coupled to the ground. With this configuration, a capacitor C4 is generated between the conductor 104 and the second detection electrodes 23 (not illustrated) of the display device with a touch detection function 1. The display device with a touch detection function 1 detects a change in the capacitor C4 based on the detection principle of the self-capacitance method, thereby detecting pressure applied to the input surface 101a.

While the display device housing 107 according to the present modification is made of an electrically conductive material, such as a metal, and the bottom thereof functions as the conductor 104, the structure of the display device housing 107 is not limited thereto. The display device housing 107 may be made of an insulating material, such as a resin material, and a metal layer may be provided to at least the bottom of the display device housing 107 to serve as the conductor 104. A metal layer may be provided to the lower surface (surface facing the bottom of the display device housing 107) of the backlight 102. While the display device housing 107 is fixed on the housing 103 of the electronic apparatus 100A, the fixing structure is not limited thereto. The cover member 101, for example, may be fixed to the housing 103.

Figure 13:
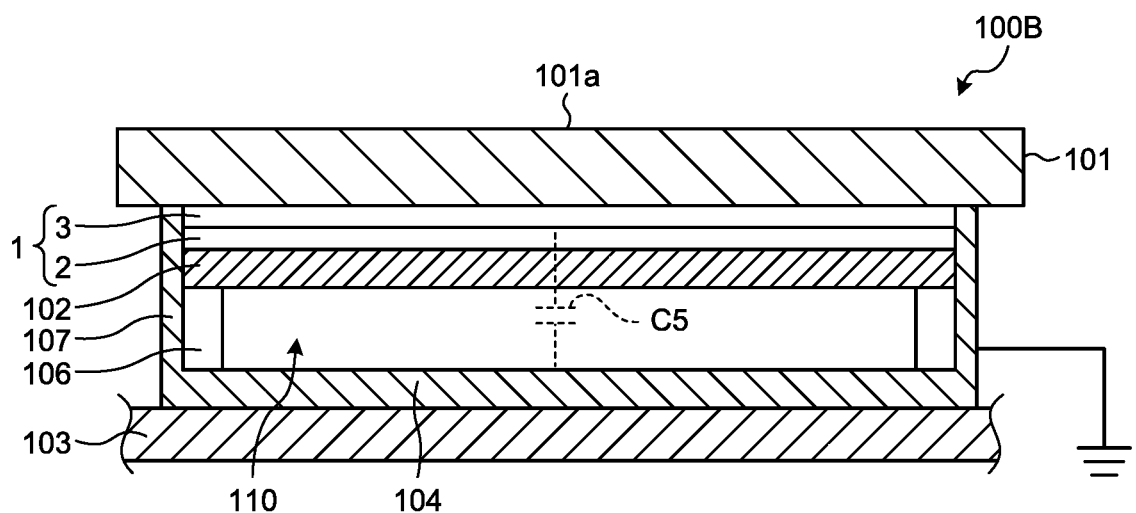
FIG. 13 is a sectional view of a schematic sectional structure of the electronic apparatus according to a second modification.

FIG. 13 is a sectional view of a schematic sectional structure of the electronic apparatus according to a second modification. In an electronic apparatus 100B according to the present modification, the display device with a touch detection function 1 and the backlight 102 are accommodated in the internal space formed by the display device housing 107 and the cover member 101. The display device with a touch detection function 1 is provided on the surface of the cover member 101 opposite to the input surface 101a. The backlight 102 is provided on the surface of the display device with a touch detection function 1 opposite to the cover member 101. The spacer 106 is provided between the backlight 102 and the display device housing 107 to form the space 110 between the backlight 102 and the display device housing 107.

Also in the present modification, the bottom of the display device housing 107 serves as the conductor 104, and a capacitance C5 is generated between the conductor 104 and the detection electrode (not illustrated) of the display device with a touch detection function 1. The display device with a touch detection function 1 can detect the pressure applied to the input surface 101a by detecting a change in the capacitance C5 based on the detection principle of the self-capacitance method described above.

Figure 14:
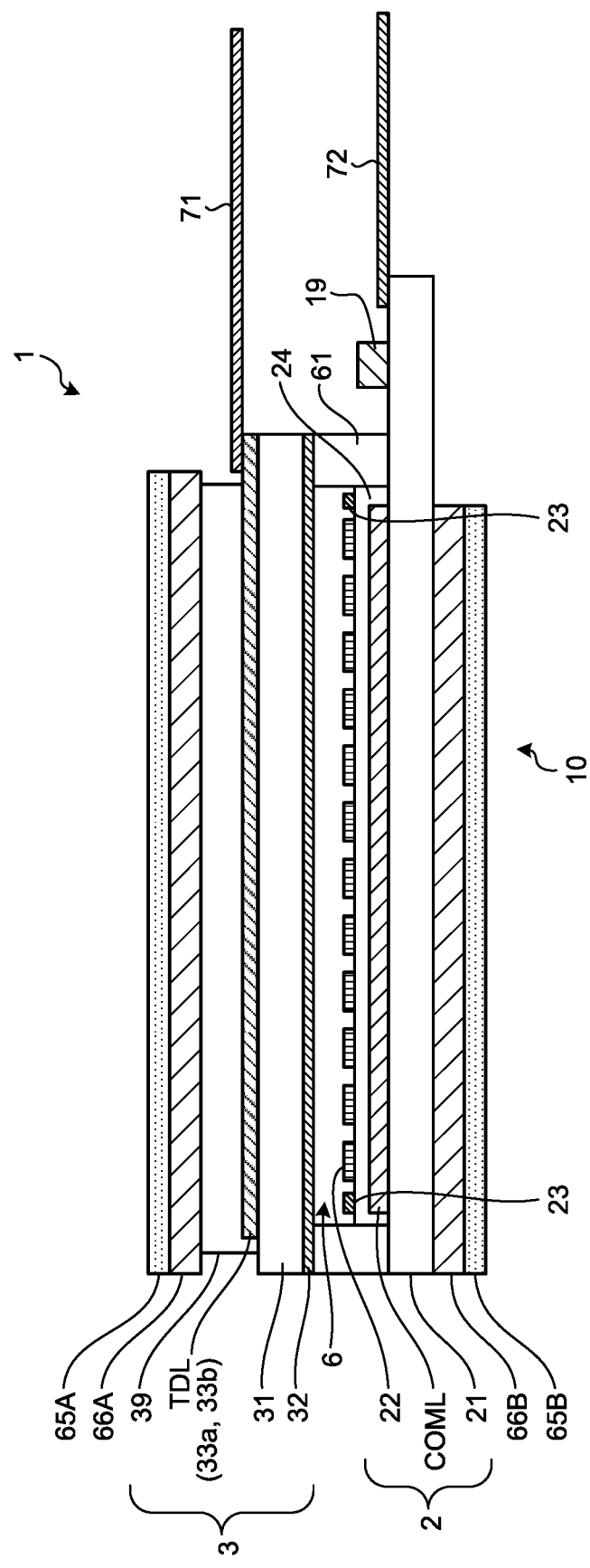
FIG. 14 is a sectional view of a schematic sectional structure of the display device with a touch detection function according to the first embodiment.
Figure 15:
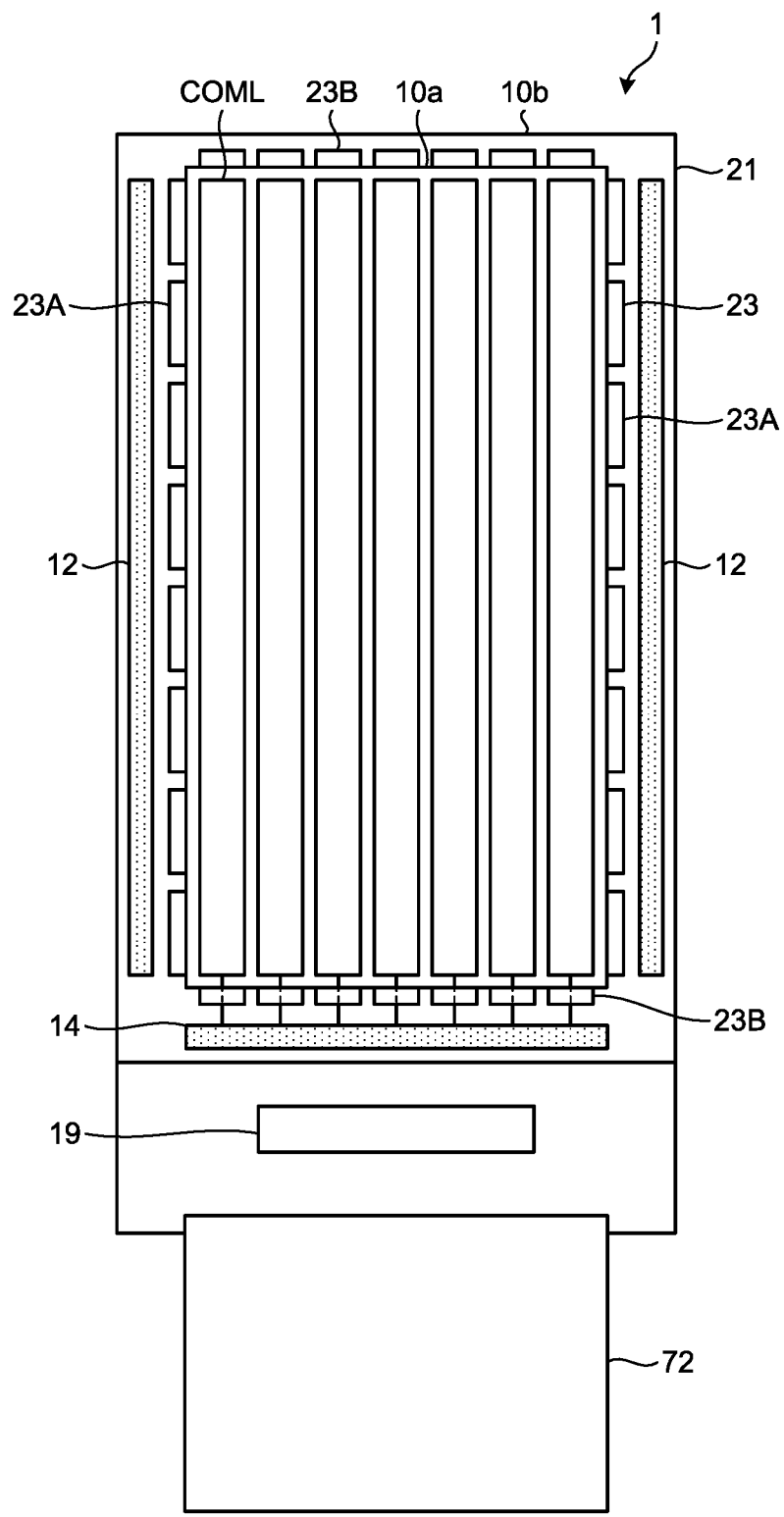
FIG. 15 is a plan view schematically illustrating a first substrate of the display device with a touch detection function.
Figure 16:
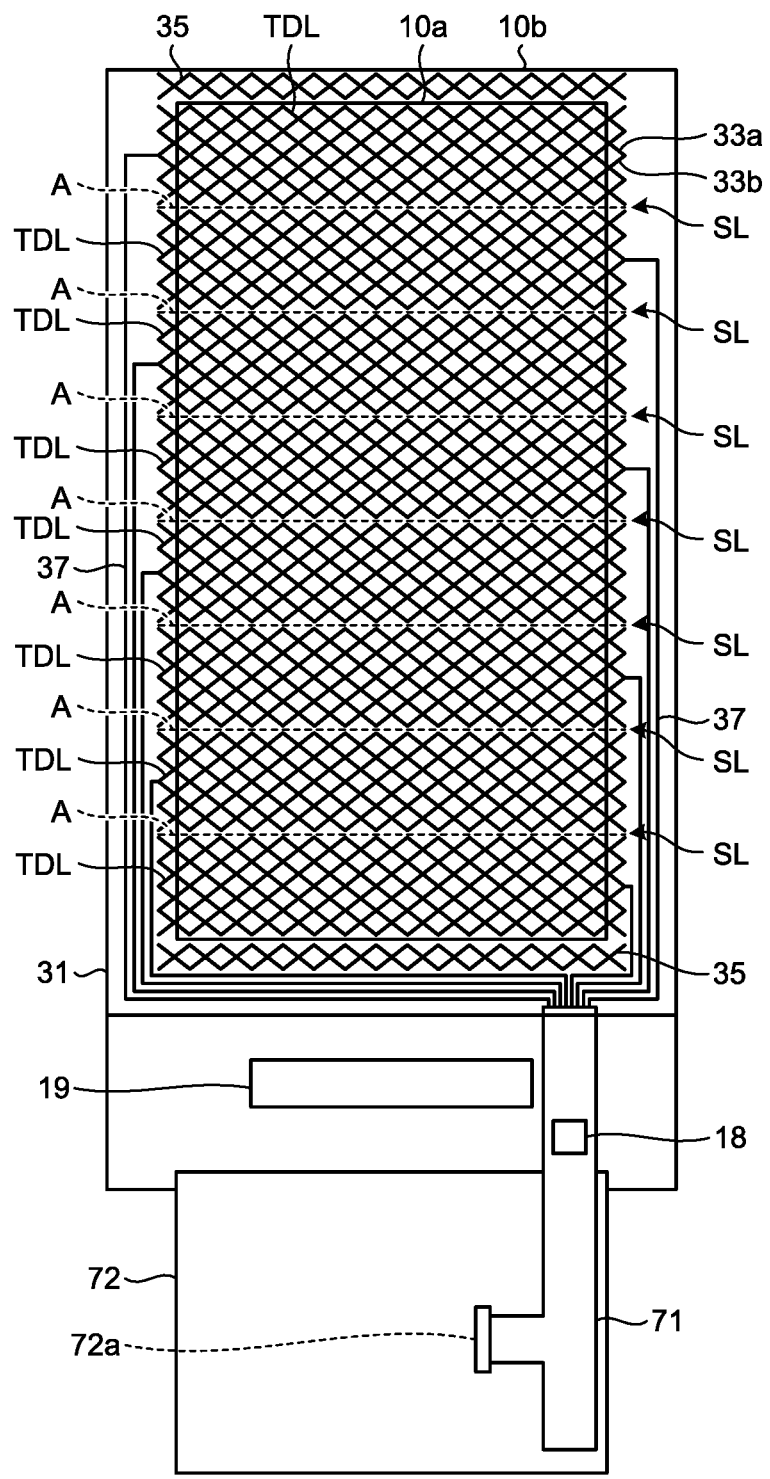
FIG. 16 is a plan view schematically illustrating a second substrate of the display device with a touch detection function.

The following describes a configuration example of the display device with a touch detection function 1. FIG. 14 is a sectional view illustrating a schematic sectional structure of the display device with a touch detection function according to the first embodiment. FIG. 15 is a plan view schematically illustrating a first substrate of the display device with a touch detection function. FIG. 16 is a plan view schematically illustrating a second substrate of the display device with a touch detection function.

As illustrated in FIG. 14, the display unit with a touch detection function 10 includes the pixel substrate 2, the counter substrate 3 that is disposed so as to face a surface of the pixel substrate 2 in the vertical direction, and a liquid crystal layer 6 serving as a display function layer that is interposed between the pixel substrate 2 and the counter substrate 3.

The pixel substrate 2 includes a first substrate 21 serving as a circuit board, pixel electrodes 22, second detection electrodes 23, drive electrodes COML, and an insulating layer 24. The first substrate 21 is provided with thin film transistors (TFT) serving as switching elements in a manner corresponding to the pixel electrodes 22. The pixel electrodes 22 are provided in a matrix above the first substrate 21 in planar view. The second detection electrodes 23 detect pressure. The drive electrodes COML are provided between the first substrate 21 and the pixel electrodes 22. The insulating layer 24 provides electrical insulation between the pixel electrodes 22 and the drive electrodes COML. A polarizing plate 65B may be provided below the first substrate 21 with an adhesive layer 66B interposed therebetween.

The first substrate 21 is provided with a display control integrated circuit (IC) 19. The display control IC 19 is a chip that is chip-on-glass (COG) mounted on the first substrate 21, and incorporates the controller 11 described above. A flexible substrate 72 is coupled to an end of the first substrate 21. The display control IC 19 outputs the control signals to, for example, scan signal lines GCL and pixel signal lines SGL (to be described later) based on the video signal Vdisp (refer to FIG. 1) supplied from an external host IC (not illustrated).

The counter substrate 3 includes a second substrate 31 and a color filter 32 provided on one surface of the second substrate 31. The other surface of the second substrate 31 is provided with the first detection electrodes TDL serving as detection electrodes of the touch panel 30. A protective layer 39 is provided on the first detection electrodes TDL. Furthermore, a polarizing plate 65A is provided above the first detection electrodes TDL with an adhesive layer 66A interposed therebetween. A flexible substrate 71 is coupled to the second substrate 31. The flexible substrate 71 is coupled to the first detection electrodes TDL through frame wire 37 described later. The color filter 32 may be disposed on the first substrate 21. The first substrate 21 and the second substrate 31 are, for example, glass substrates.

The first substrate 21 and the second substrate 31 are arranged so as to face each other with a spacer 61 providing a predetermined gap therebetween. The liquid crystal layer 6 is provided in a space between the first substrate 21 and the second substrate 31. The liquid crystal layer 6 modulates light passing therethrough according to the state of an electric field, and is made of, for example, liquid crystals of a horizontal electric field mode, such as an in-plane switching (IPS) mode, including a fringe field switching (FFS) mode. Orientation films may be provided between the liquid crystal layer 6 and the pixel substrate 2 and between the liquid crystal layer 6 and the counter substrate 3 illustrated in FIG. 14.

As illustrated in FIG. 15, the display device with a touch detection function 1 has a display area 10a and a frame area 10b. The display area 10a is an area for displaying an image, and the frame area 10b is positioned on the outer side of the display area 10a. The display area 10a has a rectangular shape having two long sides and short sides facing each other. The frame area 10b has a frame shape surrounding the four sides of the display area 10a. The display area 10a according to the present embodiment is an area for displaying an image. In a case where an image is displayed by the liquid crystal layer 6 or a white organic light-emitting diode (OLED) layer, for example, the display area 10a corresponds to a transmissive area on the color filter 32. In the case of a reflective display device, the display area 10a corresponds to a reflective area on which incident light is reflected. In a case where an image is displayed by a colored OLED, for example, the display area 10a corresponds to an area including light-emitting elements that can develop colors.

The drive electrodes COML are provided in the display area 10a of the first substrate 21. The drive electrodes COML extend in a direction along the long sides of the display area 10a, and are arranged in a direction along the short sides of the display area 10a. A light-transmitting electrically conductive material, such as indium tin oxide (ITO), is used for the drive electrodes COML.

The second detection electrodes 23 are arrayed in directions along the long side and the short side of the display area 10a. The second detection electrodes 23 arrayed in the direction along the long side of the display area 10a are referred to as second detection electrodes 23A, whereas the second detection electrodes 23 arrayed in the direction along the short side of the display area 10a are referred to as second detection electrodes 23B. The second detection electrodes 23A and 23B are arranged in a manner surrounding the display area 10a. The second detection electrodes 23A and 23B simply need to surround at least two sides of the display area 10a. The second detection electrodes 23A and 23B each have a rectangular shape. A plurality of second detection electrodes 23A are arrayed along one drive electrode COML. The length of the long side of the second detection electrode 23A is shorter than the length of the drive electrode COML in the extending direction.

The drive electrode driver 14 and the display control IC 19 are disposed on a short-side side of the frame area 10b of the first substrate 21, and the gate driver 12 is disposed on long-side sides of the frame area 10b. The flexible substrate 72 is coupled to the short-side side of the frame area 10b. The drive electrode driver 14 and the flexible substrate 72 are arranged near an end in the extending direction of the drive electrodes COML. This arrangement can reduce the length of wiring lines from the drive electrodes COML, and reduce the area of the frame area 10b.

As illustrated in FIG. 16, the first detection electrodes TDL are provided in the display area 10a of the second substrate 31. The first detection electrodes TDL extend in the direction along the short side of the display area 10a and are arrayed in the direction along the long side of the display area 10a. The first detection electrodes TDL each include a plurality of metal wires 33a and 33b. The metal wires 33a and 33b each have a plurality of bends and are formed into zigzag lines or wavy lines. The metal wires 33a and 33b extend in the direction along the short side of the display area 10a. The metal wires 33a and 33b are alternately arrayed in the direction along the long side of the display area 10a. The bends of the metal wire 33a and the bends of the metal wire 33b according to the present embodiment are coupled to each other, whereby the first detection electrodes TDL serve as mesh-like metal wiring. The metal wires 33a and 33b are separated by slits SL. The slits SL are formed at positions indicated by the dotted lines A in FIG. 16. The metal wires 33a and 33b separated by the slits SL function as one first detection electrode TDL.

Conductive layers 35 according to the present embodiment are provided on the short sides of the frame area 10b apart from the first detection electrodes TDL. The conductive layers 35 each include a plurality of metal wires 33a and 33b and have a mesh shape. The conductive layers 35 are provided at positions superimposed on the second detection electrodes 23B illustrated in FIG. 15. By supplying, to the conductive layers 35, guard signals Vsg1 synchronized with and having the same waveform as that of the second drive signals Vd supplied to the second detection electrodes 23B, stray capacitance generated in the second detection electrodes 23B can be reduced. The ends of the first detection electrodes TDL are provided in a manner superimposed on the second detection electrodes 23A. By supplying the guard signals Vsg1 also to the second detection electrodes 23A, stray capacitance generated in the second detection electrodes 23A can be reduced.

The metal wires 33a and 33b are made of a metal material including at least one of aluminum (Al), copper (Cu), silver (Ag), molybdenum (Mo), and an alloy of these metals. The metal wires 33a and 33b may be a laminated body having a plurality of layers made of one or more of these metal materials. A metal material including at least one of Al, Cu, Ag, and an alloy of these metals has lower resistance than that of a translucent conductive oxide, such as ITO, as a material for a translucent electrode. The metal material including at least one of Al, Cu, Ag, and an alloy of these metals has a light shielding property compared with a translucent conductive oxide, such as ITO. With this property, the metal material may possibly have lower transmittance, or the patterns of the first detection electrodes TDL are likely to be visually recognized. To address this, each first detection electrode TDL according to the present embodiment includes a plurality of thin metal wires 33a and 33b, and the metal wires 33a and 33b are arranged in a mesh shape by interposing a gap larger than the width of the metal wire therebetween. With this structure, the first detection electrodes TDL can have lower resistance and be made invisible. As a result, the first detection electrodes TDL have lower resistance, and the display device with a touch detection function 1 can have a smaller width, a larger screen, or higher definition.

The width of the metal wires 33a and 33b preferably falls within a range of 2 μm to 10 μm. If the width of the metal wires 33a and 33b is set to 10 μm or smaller, the area covering apertures is reduced in the display area 10a, and thus the aperture ratio is less likely to be reduced. The apertures correspond to areas in which transmission of light is not suppressed by a black matrix or the scan signal lines GCL and the pixel signal lines SGL. If the width of the metal wires 33a and 33b is set to 2 μm or larger, the shape of the metal wires 33a and 33b is stabilized, and thus breaking of the wire is less likely to occur. To reduce the reflectance, the outermost surface of the metal wires 33a and 33b is preferably subjected to blackening.

As illustrated in FIG. 16, a plurality of frame wires 37 extending from the first detection electrodes TDL are provided in the frame area 10b of the second substrate 31. The flexible substrate 71 is coupled on the short side of the frame area 10b of the second substrate 31. The frame wires 37 extend along the long sides of the frame area 10b and are coupled to the flexible substrate 71. The flexible substrate 71 is provided with a touch detection IC 18. The touch detection IC 18 includes the detector 40 illustrated in FIG. 1. The first detection signals Vdet1 output from the first detection electrodes TDL are supplied to the touch detection IC 18 via the frame wires 37 and the flexible substrate 71.

In the present embodiment, the detector 40 is a touch driver IC that is mounted on the flexible substrate 71. However, some of the functions of the detector 40 may be provided as a function of another microprocessing unit (MPU).

Specifically, a circuit, such as the MPU, provided separately from the touch driver IC may perform some functions (such as denoising) among various functions, such as the A/D conversion and the denoising that can be provided as functions of the touch driver IC.

The flexible substrate 71 is coupled to the flexible substrate 72 via a connector 72a. With this configuration, the second drive signals Vd are supplied to the second detection electrodes 23 from the second detection electrode driver 48 (refer to FIG. 1) mounted on the touch detection IC 18. The second detection signals Vdet2 output from the second detection electrodes 23 are supplied to the touch detection IC 18.

Figure 17:
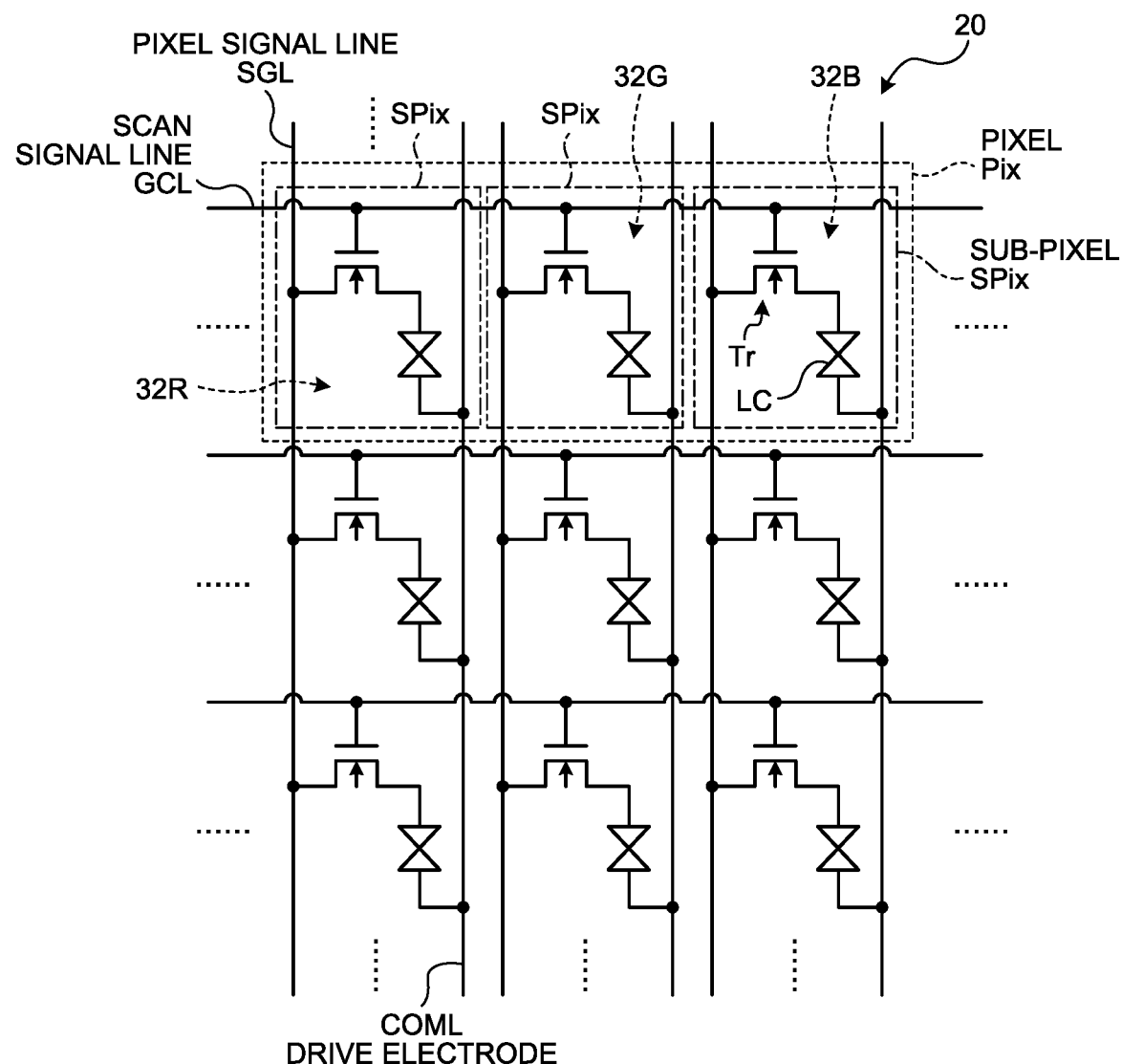
FIG. 17 is a circuit diagram of a pixel array in a display unit with a touch detection function according to the first embodiment.

The following describes a display operation of the display panel 20. FIG. 17 is a circuit diagram illustrating a pixel array of the display unit with a touch detection function according to the first embodiment. As illustrated in FIG. 17, thin film transistor elements (hereinafter, called TFT elements) Tr of the sub-pixels SPix, and wires, such as the pixel signal lines SGL and the scan signal lines GCL, are formed on the first substrate 21 (refer to FIG. 14). The pixel signal lines SGL supply the pixel signals Vpix to each of the pixel electrodes 22 and the scan signal lines GCL supply the drive signals for driving the TFT elements Tr. The pixel signal lines SGL and the scan signal lines GCL extend in a plane parallel to a surface of the first substrate 21.

The display panel 20 illustrated in FIG. 17 includes the sub-pixels SPix arranged in a matrix. Each of the sub-pixels SPix includes corresponding one of the TFT elements Tr and a liquid crystal element LC. The TFT element Tr is constituted by a thin-film transistor, and in the present example, constituted by an n-channel metal oxide semiconductor (MOS) TFT. The source of the TFT element Tr is coupled to one of the pixel signal lines SGL; the gate thereof is coupled to one of the scan signal lines GCL; and the drain thereof is coupled to one end of the liquid crystal element LC. One end of the liquid crystal element LC is coupled to the drain of the TFT element Tr, and the other end thereof is coupled to the drive electrode COML.

The sub-pixel SPix is mutually coupled through the scan signal line GCL with another sub-pixel SPix belonging to the same row of the display panel 20. The scan signal line GCL is coupled to the gate driver 12 (refer to FIG. 1), and is supplied with the scan signal Vscan from the gate driver 12. The sub-pixel SPix is mutually coupled through the pixel signal line SGL with another sub-pixel SPix belonging to the same column of the display panel 20. The pixel signal line SGL is coupled to the source driver 13 (refer to FIG. 1), and is supplied with the pixel signal Vpix from the source driver 13. The sub-pixel SPix is further mutually coupled through the drive electrode COML with another sub-pixel SPix belonging to the same column. The drive electrode COML is coupled to the drive electrode driver 14 (refer to FIG. 1), and is supplied with the first drive signal Vcom from the drive electrode driver 14. This means that the sub-pixels SPix belonging to the same one of the columns share one of the drive electrodes COML. In the present embodiment, the direction of extension of the drive electrodes COML is parallel to that of the pixel signal lines SGL.

The gate driver 12 illustrated in FIG. 1 drives so as to sequentially scan the scan signal lines GCL. The gate driver 12 applies the scan signal Vscan (refer to FIG. 1) to the gates of the TFT elements Tr of the sub-pixels SPix through the scan signal lines GCL so as to sequentially select, as a target of display driving, one row (one horizontal line) of the sub-pixels SPix. The source driver 13 supplies the pixel signals Vpix through the pixel signal lines SGL to the sub-pixels SPix constituting the selected one horizontal line. The sub-pixels SPix are configured to display one horizontal line at a time according to the supplied pixel signals Vpix. While the display operation is performed, the drive electrode driver 14 apples the first drive signals Vcom to the drive electrodes COML. The pixel electrodes 22 are supplied with a common potential by each of the first drive signals Vcom for the display operation.

The color filter 32 illustrated in FIG. 14 may include periodically arranged color regions colored in, for example, three colors of red (R), green (G), and blue (B). Color regions 32R, 32G, and 32B of the three colors of R, G, and B are associated, as one set, with the sub-pixels SPix illustrated in FIG. 17, and the sub-pixels SPix corresponding to the color regions 32R, 32G, and 32B of the three colors constitute a pixel Pix as a one set. As illustrated in FIG. 14, the color filter 32 faces the liquid crystal layer 6 in a direction orthogonal to the first substrate 21. The color filter 32 may have a combination of other colors as long as being colored in different colors from each other. The color filter 32 is not limited to having a combination of three colors, but may have a combination of four or more colors.

As illustrated in FIG. 17, in the present embodiment, the drive electrodes COML extend in the direction parallel to the extending direction of the pixel signal lines SGL, and extend in the direction intersecting the extending direction of the scan signal lines GCL. This arrangement allows the wire from the drive electrodes COML to be led toward the short-side side of the frame area 10b (toward the flexible substrate 72) (refer to FIG. 15). As a result, compared with a case of providing the drive electrodes COML in the direction orthogonal to the pixel signal lines SGL, the drive electrode driver 14 need not be provided on a long-side side of the frame area 10b, so that the frame area 10b can have a smaller width. The drive electrodes COML are not limited to extending in this direction, but may extend, for example, in the direction parallel to the scan signal lines GCL.

Figure 18:
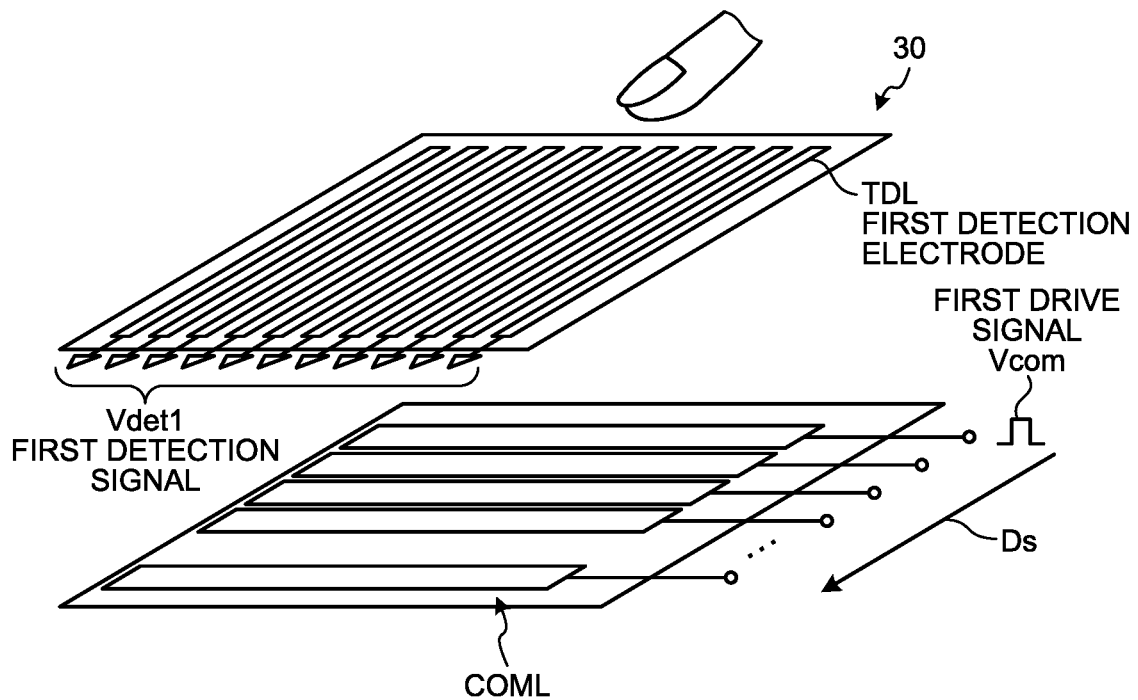
FIG. 18 is a perspective view of an exemplary configuration of drive electrodes and first detection electrodes in the display unit with a touch detection function according to the first embodiment.

The drive electrodes COML illustrated in FIGS. 14 and 15 serve as common electrodes each supplying the common potential to the pixel electrodes 22 of the display panel 20, and also serve as drive electrodes when the touch detection using the mutual capacitance method is performed on the touchscreen 30. The drive electrodes COML may serve as detection electrodes when the touch detection using the self-capacitance method is performed on the touch panel 30. FIG. 18 is a perspective view illustrating a configuration example of the drive electrodes and the first detection electrodes of the display unit with a touch detection function according to the first embodiment. The touch panel 30 is constituted by the drive electrodes COML provided on the pixel substrate 2 and the first detection electrodes TDL provided on the counter substrate 3.

The drive electrodes COML include a plurality of stripe-shaped electrode patterns extending in the right-left direction of FIG. 18. The first detection electrodes TDL include a plurality of electrode patterns extending in a direction intersecting the extending direction of the electrode patterns of the drive electrodes COML. The first detection electrodes TDL face the drive electrodes COML in the direction orthogonal to the surface of the first substrate 21 (refer to FIG. 14). Each of the electrode patterns of the first detection electrodes TDL is coupled to the input to the detection signal amplifier 42 of the detector 40 (refer to FIG. 1). An electrostatic capacitance is formed at an intersecting portion between each of the electrode patterns of the drive electrodes COML and that of the first detection electrodes TDL.

The first detection electrodes TDL and the drive electrodes COML (drive electrode blocks) are not limited to having the divided stripe shapes. The first detection electrodes TDL and the drive electrodes COML may have, for example, comb-tooth shapes. Otherwise, the first detection electrodes TDL and the drive electrodes COML only need to be divided into a plurality of portions. The shape of the slits dividing the drive electrodes COML may be linear or curved.

When the touch panel 30 performs the touch detection operation using the mutual capacitance method, this configuration causes the drive electrode driver 14 to drive the drive electrodes so as to sequentially scan the drive electrode blocks in a time-division manner, so that each detection block of the drive electrodes COML is sequentially selected along a scan direction Ds. The first detection signal Vdet1 is output from the first detection electrode TDL, so that the touch detection of one detection block is performed. That is, each of the drive electrode blocks corresponds to the drive electrode E1 in the basic principle of the mutual capacitance touch detection described above, and the first detection electrode TDL corresponds to the detection electrode E2. The touch panel 30 is configured to detect the touch input according to this basic principle. As illustrated in FIG. 18, in the touch panel 30, the first detection electrodes TDL and the drive electrodes COML intersecting each other constitute a capacitance touch sensor in a matrix form. Consequently, by scanning the entire touch detection surface of the touch panel 30, the touch panel 30 can detect a position where the conductor externally comes in contact therewith or in proximity thereto.

Figure 19:
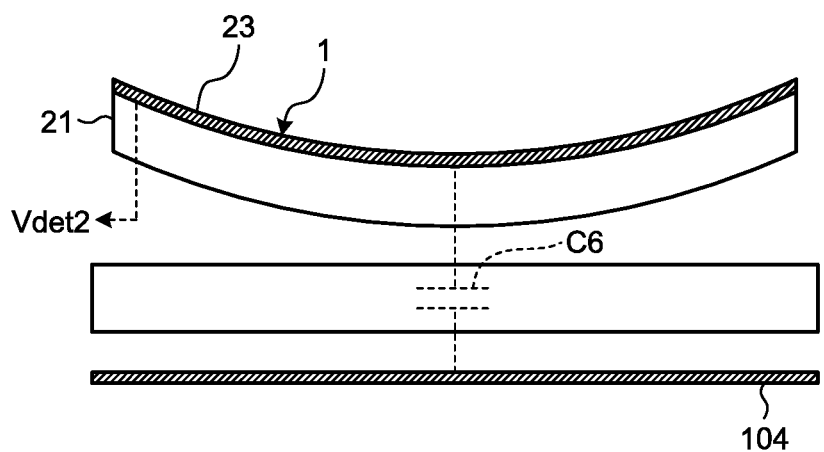
FIG. 19 is an explanatory diagram for explaining pressure detection performed by the display device with a touch detection function according to the first embodiment.

FIG. 19 is an explanatory diagram for explaining pressure detection performed by the display device with a touch detection function according to the first embodiment. As described above, the conductor 104 (e.g., the housing 103 or the display device housing 107) is provided apart from the first substrate 21 and facing the second detection electrode 23. A capacitor C6 is generated between the second detection electrode 23 and the conductor 104. When pressure is applied to the input surface 101a of the cover member 101 (refer to FIGS. 11 to 13), the cover member 101 is deformed so as to slightly bend toward the conductor 104 depending on the pressure. The first substrate 21 of the display device with a touch detection function 1 is bent together with the cover member 101, which reduces the gap between the second detection electrode 23 and the conductor 104, thereby increasing the capacitor C6.

Based on the detection principle of the self-capacitance method, the second detection signal Vdet2 is output from the second detection electrode 23. In other words, the second detection electrode 23 corresponds to the detection electrode E2 in the detection principle of the self-capacitance method. The magnitude of pressure applied to the input surface 101a can be detected based on the second detection signals Vdet2 output from the respective second detection electrodes 23. When an object is in contact with the input surface 101a, the second detection electrodes 23 can detect the magnitude of the pressure or the one-dimensional coordinates of the pressure. Because the second detection electrodes 23A and 23B are arrayed as individual electrodes, they can detect distribution of the pressure applied to the input surface 101a. The present embodiment includes the second detection electrodes 23 besides the first detection electrodes TDL. With this configuration, the present embodiment can detect the position at which an external conductor is in contact with or in proximity to the input surface 101a and the magnitude of the pressure applied at the detected position. The display device with a touch detection function 1 can combine the detection results and reflect them on various applications.

Figure 20:
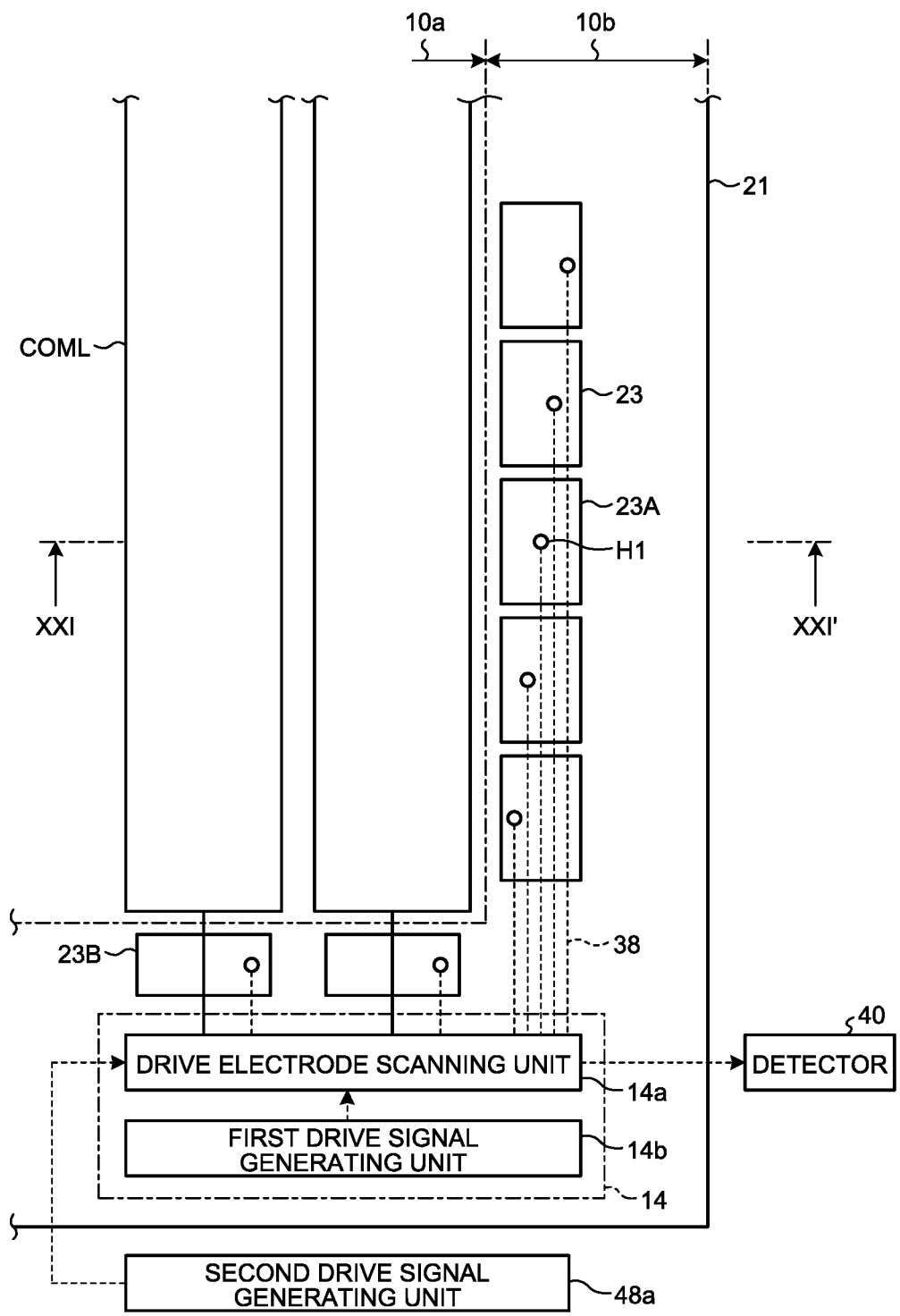
FIG. 20 is a schematic plan view illustrating the drive electrodes and second detection electrodes according to the first embodiment in an enlarged manner.
Figure 21:
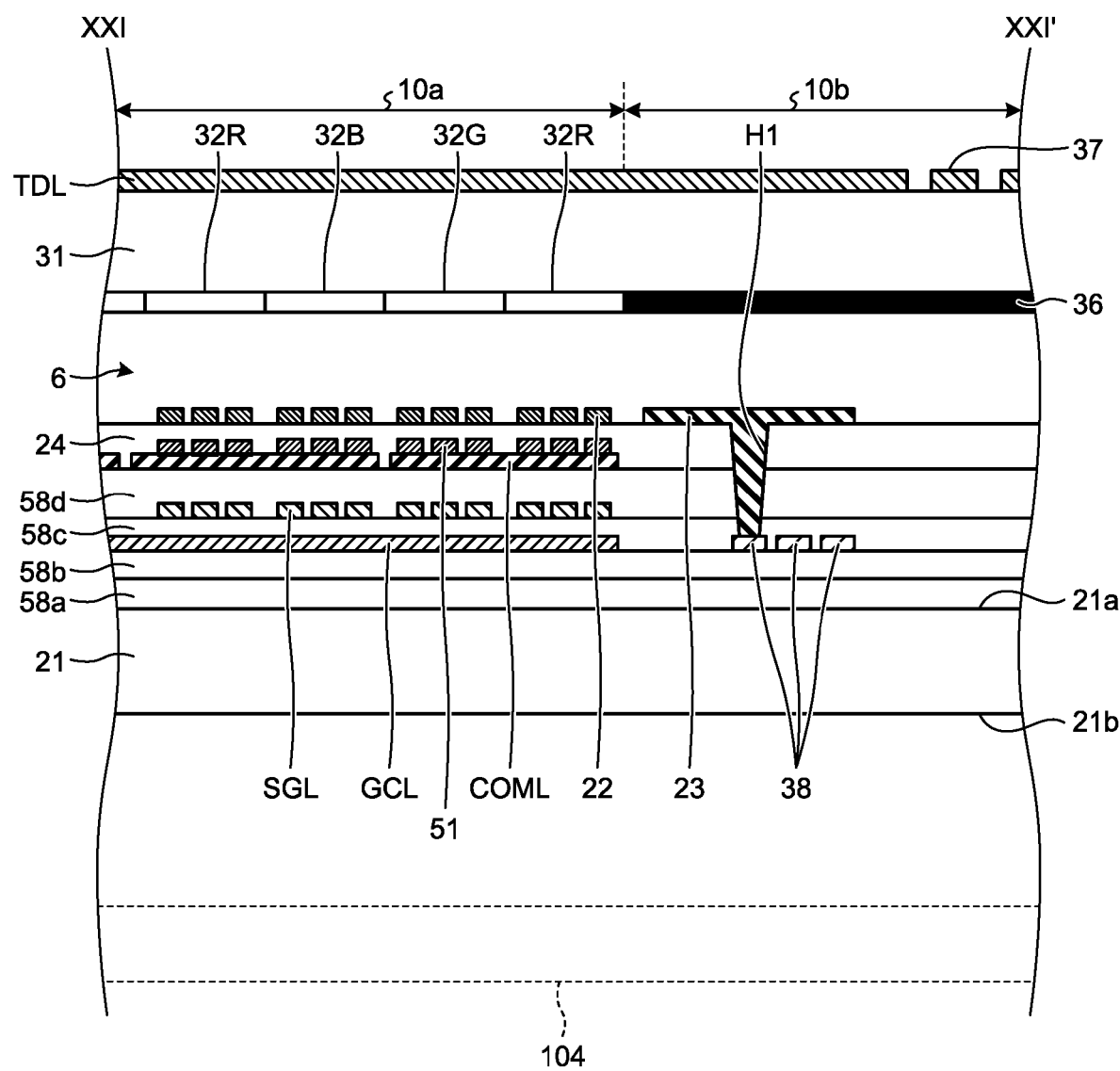
FIG. 21 is a sectional view along line XXI-XXI' in FIG. 20.

The following describes the configuration of the second detection electrodes 23 in detail. FIG. 20 is a schematic plan view illustrating the drive electrodes and the second detection electrodes according to the first embodiment in an enlarged manner. FIG. 21 is a sectional view along line XXI-XXI' in FIG. 20. As illustrated in FIG. 20, the second detection electrodes 23A are provided in the frame area 10b along the long side of the display area 10a. The second detection electrodes 23B are provided in the frame area 10b along the short side of the display area 10a. The second detection electrodes 23A and 23B are coupled to coupling wires 38 through respective contact holes H1. The shape and the number of the second detection electrodes 23A and 23B are given by way of example only and may be appropriately changed. While the second detection electrodes 23B are arranged in a manner corresponding to the respective drive electrodes COML, the arrangement of the second detection electrodes 23B is not limited thereto. The number of the second detection electrodes 23B may be larger than or smaller than that of the drive electrodes COML. In the present specification, the "frame area 10b" indicates an area positioned on the inner side of the outer periphery of the first substrate 21 and on the outer side of the display area 10a.

The drive electrode driver 14 includes a drive electrode scanning unit 14a and a first drive signal generating unit 14b. The first drive signal generating unit 14b generates the first drive signals Vcom and supplies them to the drive electrode scanning unit 14a. To perform the mutual capacitance touch detection described above, the drive electrode scanning unit 14a performs scanning in a manner sequentially selecting one detection block of the drive electrodes COML. The drive electrode scanning unit 14a supplies the first drive signals Vcom to the drive electrodes COML of the selected one detection block.

The drive electrode scanning unit 14a is coupled to the second detection electrodes 23A and 23B via the coupling wires 38. The drive electrode scanning unit 14a sequentially or simultaneously selects the second detection electrodes 23A and 23B. A second drive signal generating unit 48a included in the second detection electrode driver 48 (refer to FIG. 1) generates the second drive signals Vd and supplies them to the drive electrode scanning unit 14a. The second drive signal generating unit 48a may be mounted on the touch detection IC 18 (refer to FIG. 16). To detect pressure, the drive electrode scanning unit 14a selects the second detection electrodes 23A and 23B as detection targets and supplies the second drive signals Vd to the selected second detection electrodes 23A and 23B. The second detection electrodes 23A and 23B output, to the detector 40, output signals depending on capacitance change between the conductor 104 and the second detection electrodes 23A and 23B. The drive electrode scanning unit 14a is coupled to the drive electrodes COML and the second detection electrodes 23A and 23B. Alternatively, a scanning unit that scans the drive electrodes COML and a scanning unit that scans the second detection electrodes 23A and 23B may be separately provided.

The second detection electrodes 23A and 23B according to the present embodiment are provided around the display area 10a, and they each detect pressure. With this configuration, the present embodiment can accurately detect the pressure. In pressure detection using the drive electrodes COML, for example, it may possibly be difficult to detect pressure distribution in the extending direction of the drive electrodes COML due to no resolution for information on pressure in the extending direction of the drive electrodes COML. The second detection electrodes 23A according to the present embodiment are provided along at least one side of the display area 10a and arrayed in the extending direction of the drive electrodes COML. With this configuration, the present embodiment can accurately detect pressure distribution in a direction along the extending direction of the drive electrodes COML.

In other words, the present embodiment can detect the coordinates of pressure in different directions by the second detection electrodes 23A and 23B provided along the periphery of the display area 10a and by the drive electrodes COML. Based on the results, the present embodiment can calculate the two-dimensional coordinates of the applied pressure. The present embodiment can calculate pressure applied at a plurality of points using the longitudinal and lateral pressure sensors (the second detection electrodes 23A and 23B). Furthermore, the present embodiment can readily complement pressure sensor information using information on the coordinates and the number of fingers, for example, detected on the capacitance touch panel 30. The pressure sensors in the frame area 10b are arranged left and right, top and bottom. By comparing the pressure value detected by the pressure sensors arranged left and right (second detection electrodes 23A) with the coordinates of a finger, the present embodiment can calculate the pressure value at the position pressed by the finger. If output of the pressure value varies in the plane, the present embodiment creates a correction table in advance. By comparing the output with the correction table, the present embodiment can readily correct the variation of the pressure value.

The second detection electrodes 23A and 23B simply need to be provided along at least two sides of the display area 10a. This configuration requires a smaller number of detection electrodes than a case where a plurality of electrodes are arranged in a matrix within the display area 10a. As a result, the configurations of the touch detection IC 18 and the second detection electrode driver 48 can be simplified. Even when an input operation is performed at a plurality of positions, the input positions are detected by the drive electrodes COML and the first detection electrodes TDL. Based on the information on the input positions and the information on pressure, the present embodiment can therefore calculate the pressure applied at the input positions.

While the second detection electrodes 23A and 23B according to the present embodiment are provided in the frame area 10b, the arrangement of the second detection electrodes 23A and 23B is not limited thereto. The second detection electrodes 23A and 23B may be provided in the display area 10a or across the display area 10a and the frame area 10b.

As illustrated in FIG. 21, the first substrate 21 has a first surface 21a and a second surface 21b opposite to the first surface 21a. The scan signal lines GCL is provided on the first surface 21a side with an insulating layer 58a and an insulating layer 58b interposed therebetween. The coupling wire 38 is provided on the insulating layer 58b at the same layer as that of the scan signal lines GCL. An insulating layer 58c is provided on the coupling wire 38 and the scan signal lines GCL, and the pixel signal lines SGL are provided on the insulating layer 58c. A planarization layer 58d is provided on the pixel signal lines SGL, and the drive electrodes COML are provided on the planarization layer 58d. A plurality of conductive wires 51 are provided on the drive electrodes COML. The insulating layer 24 is provided on the drive electrodes COML and the conductive wire 51. The pixel electrodes 22 and the second detection electrodes 23 are provided on the insulating layer 24. The conductor 104 is arranged on the second surface 21b side of the first substrate 21 apart from the first substrate 21.

The conductive wires 51 are provided on the drive electrodes COML at positions superimposed on the pixel signal lines SGL. The conductive wire 51 is made of the same metal material as that of the metal wires 33a and 33b of the first detection electrodes TDL. The conductive wire 51 is made of a metal material including at least one of Al, Cu, Ag, Mo, and an alloy of these metals. With the conductive wire 51, the apparent resistance of the drive electrodes COML (total resistance of the drive electrodes COML and the conductive wire 51) is reduced compared with a case where the drive electrodes COML alone are provided.

The second detection electrodes 23 according to the present embodiment are provided at the same layer as that of the pixel electrodes 22. The second detection electrodes 23 are provided in the layer closer to the second substrate 31 than the drive electrodes COML. In this case, the second detection electrodes 23 are preferably provided at positions not superimposed on the drive electrodes COML. With this configuration, the present embodiment can accurately detect capacitance change between the second detection electrodes 23 and the conductor 104. The second detection electrodes 23 can be made of the same material as that of the pixel electrodes 22 and made of a translucent conductive material, such as ITO.

As illustrated in FIG. 21, the display area 10a of the second substrate 31 is provided with the color regions 32R, 32G, and 32B of the color filter 32, and the frame area 10b is provided with a light shielding layer 36. The first detection electrodes TDL on the upper surface of the second substrate 31 preferably extend to the positions superimposed on the second detection electrodes 23. By supplying, to the first detection electrodes TDL, the guard signals Vsg1 synchronized with and having the same waveform as that of the second drive signals Vd in pressure detection, the first detection electrodes TDL serve as guard electrodes. This mechanism can reduce stray capacitance in the second detection electrodes 23. As a result, the present embodiment can output the second drive signals Vd supplied to the second detection electrodes 23 in a responsive waveform, thereby suppressing reduction in the detection sensitivity. Because variation in the stray capacitance is reduced, the present embodiment can suppress an error in the second detection signals Vdet2, thereby suppressing reduction in the detection accuracy. The guard signals Vsg1 may be supplied from the second drive signal generating unit 48a or another power source.

Figure 22:
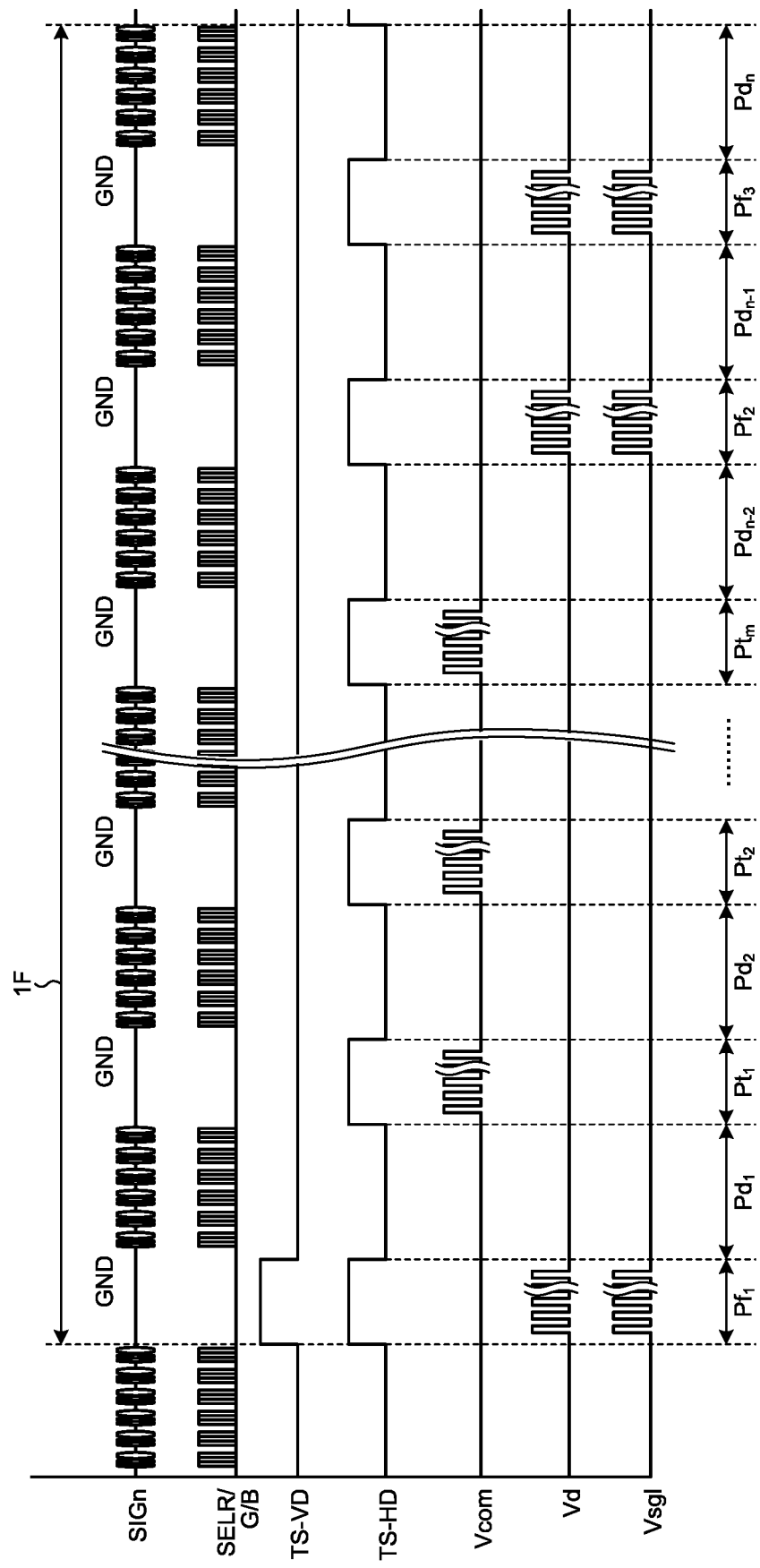
FIG. 22 is a timing waveform diagram of an exemplary operation performed by the display device with a touch detection function according to the first embodiment.

The following describes a driving method of the display device with a touch detection function 1 according to the present embodiment. FIG. 22 is a timing waveform diagram of an exemplary operation performed by the display device with a touch detection function according to the first embodiment.

In an example of an operating method of the display device with a touch detection function 1, the display device with a touch detection function 1 performs a touch detection operation (touch detection period), a pressure detection operation (pressure detection period), and a display operation (display operation period) in a time division manner. The touch detection operation, the pressure detection operation, and the display operation may be performed in any division manner. The following describes a case where the touch detection operation, the pressure detection operation, and the display operation are performed in a manner each divided into a plurality of parts in one frame period (1F) of the display panel 20, that is, a time required to display video information of one screen.

As illustrated in FIG. 22, when a control signal (TS-VD) is turned on (high level), one frame period (1F) is started. A control signal (TS-HD) is repeatedly turned on (high level) and off (low level) in one frame period (1F). In the period when the control signal (TS-HD) is turned on, the touch detection operation or the pressure detection operation is performed. In the period when the control signal (TS-HD) is turned off, the display operation is performed. The control signal (TS-VD) and the control signal (TS-HD) are output based on clock signals generated by a clock generating unit of the controller 11 (refer to FIG. 1). One frame period (1F) is composed of a plurality of display operation periods $Pd_x$ (x=1, 2, ... n), a plurality of touch detection periods $Pt_x$ (x=1, 2, ... m) for performing the touch detection operation, and a plurality of pressure detection periods $Pf_1$, $Pf_2$, and $Pf_3$ for performing the pressure detection operation. These periods are alternately arranged on a temporal axis as follows: the pressure detection period $Pf_1$, the display operation period $Pd_1$, the touch detection period $Pt_1$, the display operation period $Pd_2$, the touch detection period $Pt_2$, etc.

The controller 11 supplies the pixel signals Vpix to the pixels Pix (refer to FIG. 17) in a plurality of rows selected in each display operation period $Pd_x$ via the gate driver 12 and the source driver 13. FIG. 22 illustrates a selection signal (SELR/G/B) for selecting three colors of RGB and a video signal (SIGn) for each color. Based on the selection signal (SELR/G/B), sub-pixels SPix corresponding thereto are selected. Subsequently, the video signal (SIGn) for each color is supplied to the selected sub-pixels SPix, whereby an operation for displaying an image is performed. In each display operation period $Pd_x$, an image obtained by dividing the video signals Vdisp of one screen into n is displayed. Through the display operation periods $Pd_1$, $Pd_2$, . . . $Pd_n$, video information of one screen is displayed. The drive electrodes COML also serve as the common electrodes of the display panel 20. In the display operation period $Pd_x$, the drive electrode driver 14 supplies, to the selected drive electrodes COML, the first drive signals Vcom serving as a common potential for display drive.

In the touch detection periods $Pt_x$ (x=1, 2, . . . m), the controller 11 outputs control signals to the drive electrode driver 14. The drive electrode driver 14 supplies the first drive signals Vcom for touch detection to the drive electrodes COML. Based on the basic principle of the mutual capacitance touch detection described above, the detector 40 determines whether touch input is performed on the display area 10*a* and calculates the coordinates of the input position by the first detection signals Vdet1 supplied from the first detection electrodes TDL.

In the touch detection period $Pt_x$, the scan signal lines GCL and the pixel signal lines SGL (refer to FIG. 17) may be in a floating state where no voltage signal is supplied thereto and their electric potential is not fixed. The scan signal lines GCL and the pixel signal lines SGL may be supplied with a signal synchronized with and having the same waveform as that of the first drive signal Vcom. This mechanism suppresses capacitive coupling between the drive electrodes COML and the scan signal lines GCL and capacitive coupling between the drive electrodes COML and the pixel signal lines SGL, thereby reducing stray capacitance. The present embodiment thus can suppress reduction of the detection sensitivity in touch detection.

In the pressure detection periods $Pf_1$, $Pf_2$, and $Pf_3$, the controller 11 outputs control signals to the second detection electrode driver 48. The second detection electrode driver 48 supplies the second drive signals Vd to the second detection electrodes 23. Based on the basic principle of the self-capacitance method described above, the detector 40 calculates pressure applied to the input surface 101*a* (refer to FIG. 11 and other figures) by the second detection signals Vdet2 supplied from the second detection electrodes 23. In the pressure detection periods $Pf_1$, $Pf_2$, and $Pf_3$, the second detection electrode driver 48 supplies the guard signals Vsg1 to the first detection electrodes TDL. While the guard signal Vsg1 preferably has a waveform with the same amplitude and the same frequency as those of the second drive signal Vd, it may have a different amplitude.

The pressure detection periods $Pf_1$, $Pf_2$, and $Pf_3$ are arranged at periods different from the touch detection periods $Pt_x$ (x=1, 2, . . . m). With this setting, the first detection electrodes TDL can be used as guard electrodes in the pressure detection periods $Pf_1$, $Pf_2$, and $Pf_3$. The present embodiment thus can suppress generation of stray capacitance and accurately detect pressure. The guard electrode in this case indicates an electrode facing the position where stray capacitance is generated and the electrode to which the same waveform as that of the drive waveform in pressure detection is applied so as to reduce the stray capacitance.

The present embodiment may perform detection using all the second detection electrodes 23 in every period of the pressure detection periods $Pf_1$, $Pf_2$, and $Pf_3$. Alternatively, the present embodiment may perform detection while dividing the second detection electrodes 23 for each period. While the pressure detection periods $Pf_1$, $Pf_2$, and $Pf_3$ are provided as three periods in one frame period (1F), the pressure detection period may be provided at least as one period or four or more periods. The arrangement of the pressure detection periods $Pf_1$, $Pf_2$, and $Pf_3$ in one frame period (1F) can be changed. The pressure detection periods $Pf_1$, $Pf_2$, and $Pf_3$ may be arranged after all the touch detection periods $Pt_x$, for example.

As described above, the display device with a touch detection function 1 according to the present embodiment includes the first substrate 21, the drive electrodes COML (first electrodes), the second detection electrodes 23 (second electrodes), and the conductor 104. The first substrate 21 has the first surface 21*a* and the second surface 21*b* opposite to the first surface 21*a*. The drive electrodes COML are provided in the display area 10*a* of the first substrate 21 and detect an external proximate object that is in contact with or in proximity to the first surface 21*a* side of the first substrate 21. The second detection electrodes 23 are provided along at least one side of the display area 10*a*. The conductor 104 is provided on the second surface 21*b* side of the first substrate 21 apart from the first substrate 21 and forms an electrostatic capacitor between the conductor 104 and the second detection electrodes 23.

The present embodiment can both detect the position where the external proximate object is in contact with or in proximity to the first surface 21*a* side and detect the magnitude of pressure applied to the detected position. Because the second detection electrodes 23 are provided along at least one side of the display area 10*a*, the present embodiment can accurately detect pressure distribution. With the second detection electrodes 23A and 23B provided along the display area 10*a* and with the drive electrodes COML, the present embodiment can calculate the pressure value at the position to which the pressure is applied.

Second Embodiment

Figure 23:
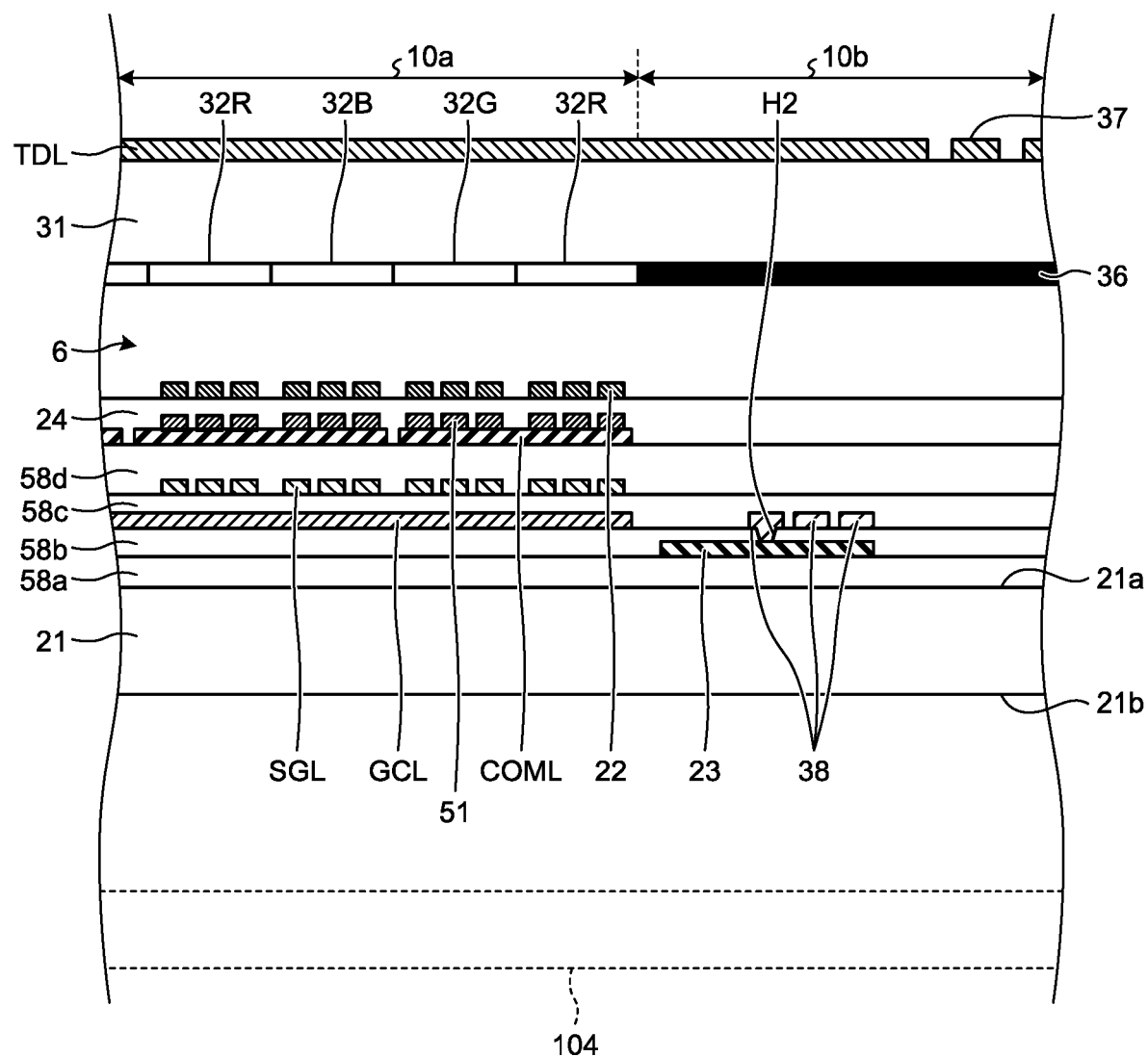
FIG. 23 is a schematic sectional view schematically illustrating a sectional structure of the display device with a touch detection function according to a second embodiment.

FIG. 23 is a schematic sectional view schematically illustrating a sectional structure of the display device with a touch detection function according to a second embodiment. The second detection electrodes 23 according to the present embodiment are provided on the first surface 21*a* side of the first substrate 21 with the insulating layer 58*a* interposed therebetween. The second detection electrodes 23 are arranged at a layer different from those of the pixel electrodes 22, the drive electrodes COML, the pixel signal lines SGL, and the scan signal lines GCL. The second detection electrodes 23 are arranged at a layer closer to the first substrate 21 than the scan signal lines GCL. The coupling wires 38 are provided at the same layer as that of the scan signal lines GCL and coupled to the second detection electrodes 23 through respective contact holes H2. The arrangement of the second detection electrodes 23, the coupling wires 38, and other components in planar view is the same as the arrangement illustrated in FIG. 20.

With this configuration, the second detection electrodes 23 are provided closer to the first substrate 21 than the various wires and electrodes, thereby reducing the distance between the conductor 104 and the second detection electrodes 23. The present embodiment thus can improve the sensitivity in pressure detection. This configuration requires a smaller number of conductors, such as wires, arranged between the second detection electrodes 23 and the conductor 104. The present embodiment thus can reduce generation of stray capacitance between various wires and the second detection electrodes 23, thereby improving the accuracy in pressure detection.

Third Embodiment

Figure 24:
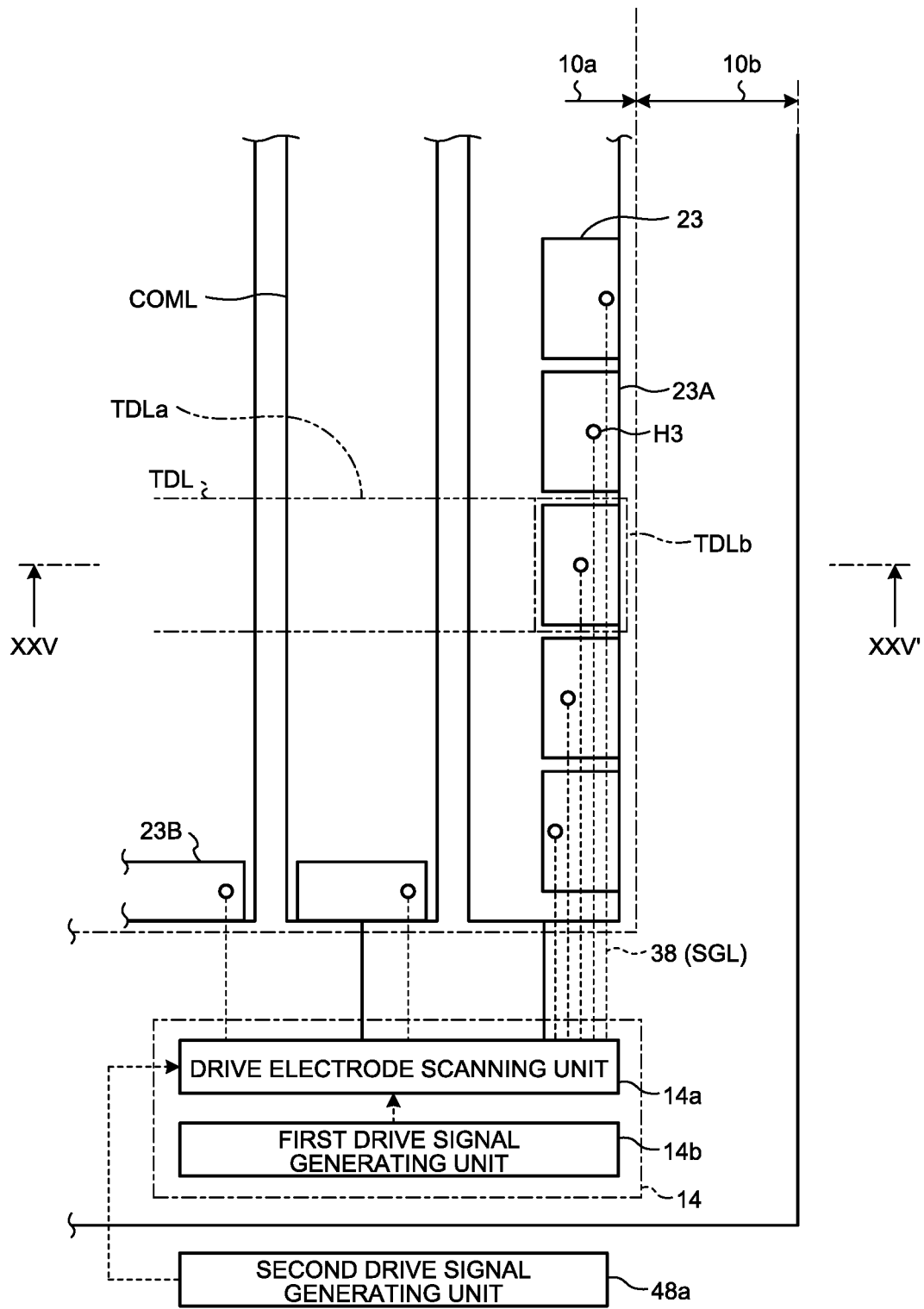
FIG. 24 is a schematic plan view illustrating the drive electrodes and the second detection electrodes according to a third embodiment in an enlarged manner.
Figure 25:
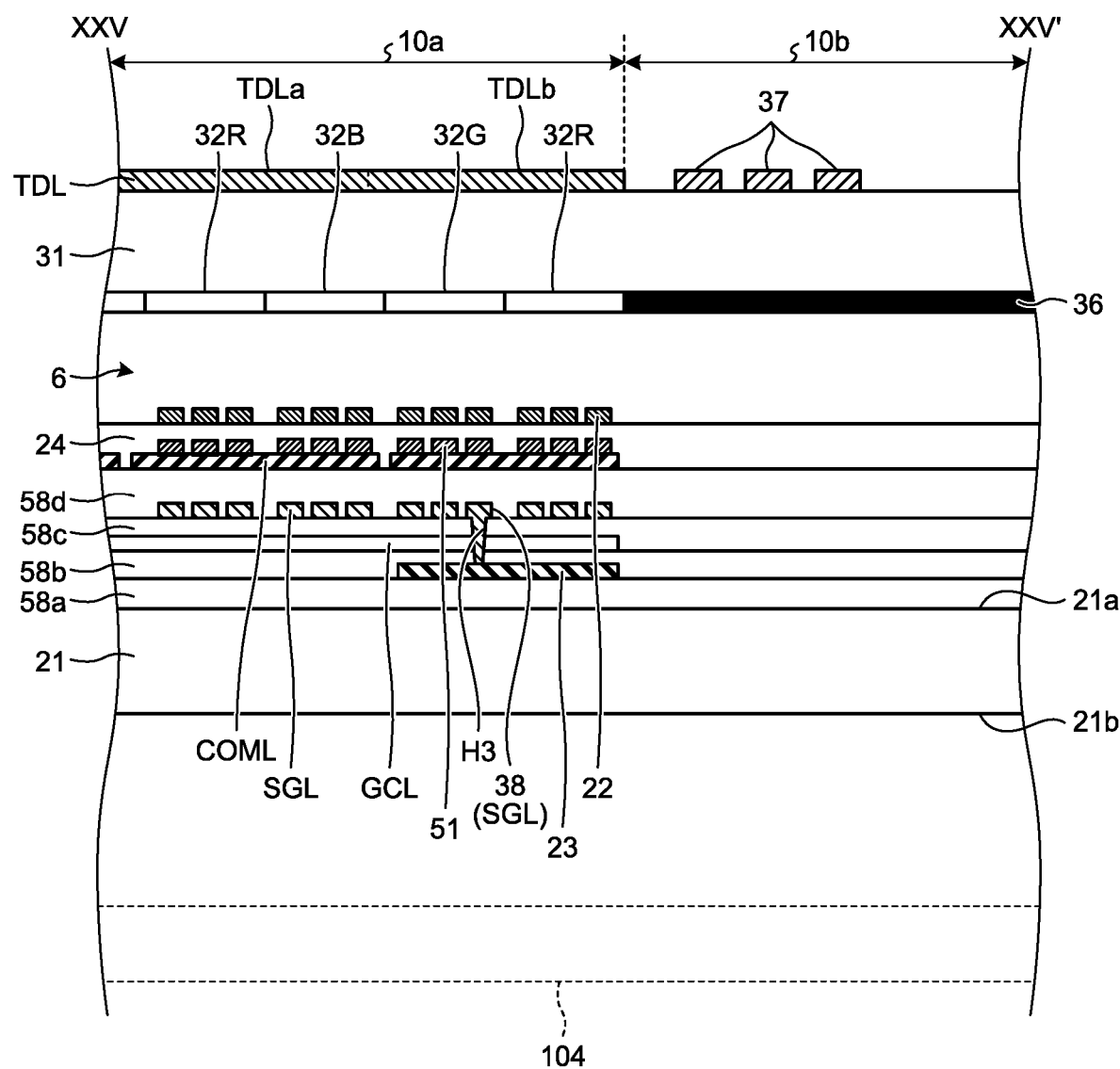
FIG. 25 is a sectional view along line XXV-XXV' in FIG. 24.

FIG. 24 is a schematic plan view illustrating the drive electrodes and the second detection electrodes according to a third embodiment in an enlarged manner. FIG. 25 is a sectional view along line XXV-XXV' in FIG. 24.

As illustrated in FIG. 24, the second detection electrodes 23 according to the present embodiment are provided in the display area 10a. The second detection electrodes 23A are arranged along the long side of the display area 10a in a manner superimposed on the drive electrode COML. The second detection electrodes 23B are arranged along the short side of the display area 10a in a manner superimposed on the ends of the drive electrodes COML in the extending direction.

FIG. 24 illustrates the first detection electrode TDL by the alternate long and two short dashes line. To simplify the drawing, FIG. 24 schematically illustrates one first detection electrode TDL. The first detection electrode TDL extends in a direction intersecting with the extending direction of the drive electrodes COML. The first detection electrode TDL has a first portion TDLa and a second portion TDLb. The second portion TDLb corresponds to the end of the first detection electrode TDL in the extending direction. The first portion TDLa corresponds to a portion positioned at the center of the display area 10a. The second portion TDLb is an area having lower detection sensitivity in touch detection, and the second detection electrode 23 is arranged at an area under the second portion TDLb. The configuration of the first portion TDLa and the second portion TDLb of the first detection electrode TDL will be described later in detail.

As illustrated in FIG. 25, the second detection electrodes 23 are provided on the insulating layer 58a above the first substrate 21. The insulating layer 58b is provided on the second detection electrodes 23, and the scan signal lines GCL are provided on the insulating layer 58b. The insulating layer 58c is provided on the scan signal lines GCL, and the pixel signal lines SGL are provided on the insulating layer 58c. The planarization layer 58d is provided on the pixel signal lines SGL, and the drive electrodes COML are provided on the planarization layer 58d. The conductive wires 51 are provided on the drive electrodes COML. The insulating layer 24 is provided on the drive electrodes COML and the conductive wires 51. The pixel electrodes 22 are provided on the insulating layer 24.

Part of the pixel signal lines SGL according to the present embodiment are coupled to the second detection electrodes 23 through respective contact holes H3. In other words, the pixel signal lines SGL also serve as the coupling wires 38, and the second detection electrodes 23 are coupled to the drive electrode scanning unit 14a via the coupling wires 38 (pixel signal lines SGL) as illustrated in FIG. 24. As described above, the pressure detection periods $Pf_1$, $Pf_2$, and $Pf_3$ are arranged at periods different from the display operation periods $Pd_x$ (x=1, 2, . . . n). In the pressure detection periods $Pf_1$, $Pf_2$, and $Pf_3$, the TFT elements Tr (refer to FIG. 17) coupled to the respective sub-pixels SPix are turned off. Thus, even if the second drive signals Vd are supplied via the pixel signal lines SGL, and the second detection signals Vdet2 are output via the pixel signal lines SGL, the present embodiment can suppress an effect on the display image.

As described above, the second detection electrodes 23 according to the present embodiment are provided in the display area 10a. With this configuration, the area of the frame area 10b can be reduced. The second detection electrodes 23 are arranged under the second portions TDLb of the first detection electrodes TDL. With this configuration, the present embodiment can detect pressure while suppressing reduction in the touch detection sensitivity. Because the pixel signal lines SGL also serve as the coupling wires 38, the present embodiment requires no additional wires in the display area 10a, thereby saving the area of the aperture region.

Figure 26:
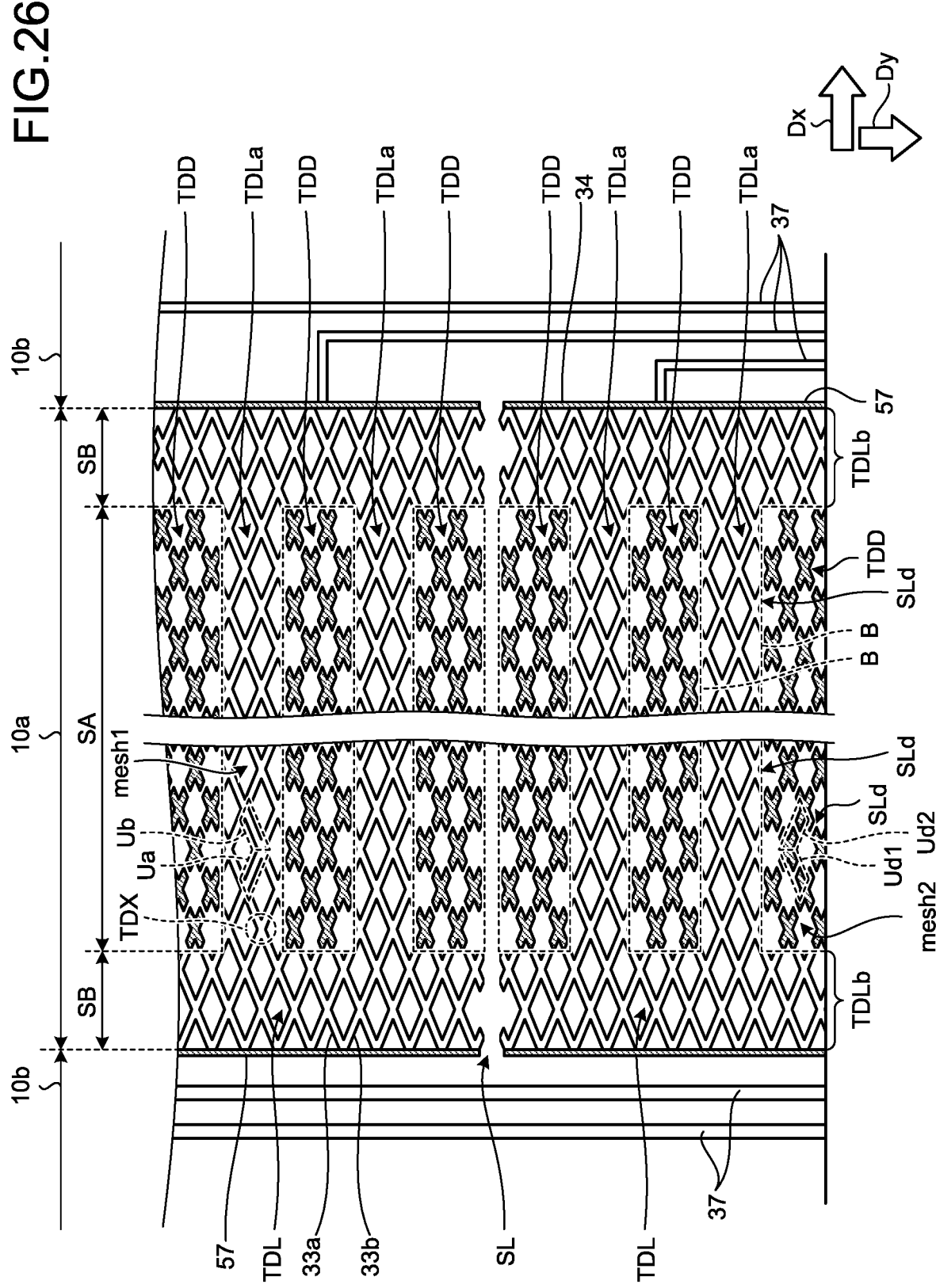
FIG. 26 is a plan view of the first detection electrodes of the display device with a touch detection function according to the third embodiment.
Figure 27:
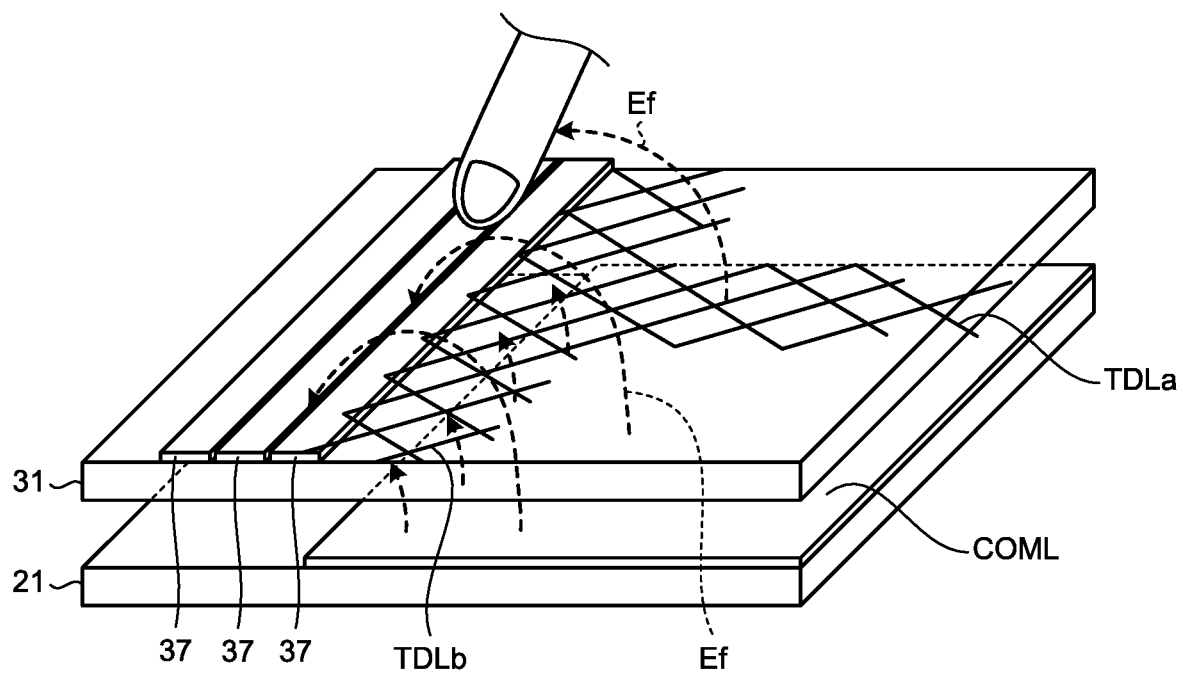
FIG. 27 is a perspective view for schematically explaining a fringing electric field generated between the drive electrode and frame wire.

FIG. 26 is a plan view of the first detection electrodes of the display device with a touch detection function according to the third embodiment. FIG. 27 is a perspective view for schematically explaining a fringing electric field generated between the drive electrode and the frame wire.

The first detection electrodes TDL are separated by the slits SL formed in the metal wires 33a and 33b. The separated first detection electrodes TDL are arrayed in a second direction Dy. FIG. 26 illustrates two first detection electrodes TDL out of the first detection electrodes TDL. The first detection electrodes TDL each include the metal wires 33a and 33b. The metal wires 33a and 33b have a line symmetric shape with respect to a line parallel to a first direction Dx and are alternately arrayed in the second direction Dy. The bends of the metal wires 33a and 33b arrayed in the second direction Dy are coupled to each other, thereby forming into intersections TDX. The metal wire 33a is electrically coupled to the metal wire 33b at the intersections TDX. With this configuration, the metal wires 33a and 33b have surrounded areas mesh1 surrounded by thin wire pieces Ua and Ub, thereby providing mesh-like metal wiring in the display area 10a.

Coupling portions 57 are provided at both ends of the first detection electrodes TDL and are coupled to the metal wires 33a and 33b. The first detection electrodes TDL are coupled to the frame wire 37 via the coupling portions 57 provided at the ends in the first direction Dx side.

The first detection electrodes TDL each have the first portions TDLa and the second portions TDLb. The first portions TDLa extend in the first direction Dx and are arrayed in the second direction Dy. Dummy electrodes TDD are arranged between the first portions TDLa. The second portions TDLb are arranged on both ends of the first detection electrodes TDL and extend in the first direction Dx. The second portions TDLb are arranged along the boundary between the display area 10a and the frame area 10b. One or a plurality of first portions TDLa are arranged between the second portions TDLb arranged at both ends, and the first portions TDLa are coupled to the second portions TDLb. The first portions TDLa mainly function as the detection electrode E2 in the principle of the mutual capacitance touch detection described above. The area overlapping with the first portions TDLa in the first direction Dx corresponds to a valid detection area SA. The areas overlapping with the second portions TDLb correspond to a peripheral area SB having lower detection sensitivity than that of the valid detection area SA.

Slits SLd are formed at positions indicated by the dotted lines B of the metal wires 33a and 33b as illustrated in FIG. 26 so that the dummy electrodes TDD are separated from the first detection electrodes TDL. The dummy electrodes TDD do not function as touch detection electrodes. The dummy electrodes TDD have a rectangular shape with their long sides extending in a direction along the first direction Dx. The dummy electrodes TDD are arrayed in the second direction Dy in each first detection electrode TDL. The second portions TDLb may include the dummy electrodes TDD.

The dummy electrodes TDD each include metal wires composed of a plurality of thin wire pieces Ud1 and Ud2 and the plurality of thin wire pieces Ud1 and Ud2 are repeatedly coupled to each other in the first direction Dx. The metal wires are coupled to each other in the second direction Dy. The dummy electrodes TDD have a mesh shape having surrounded areas mesh2 surrounded by the thin wire pieces Ud1 and Ud2. The slits SLd are formed in the thin wire pieces Ud1 and Ud2. The provision of the dummy electrodes TDD can reduce an electrostatic capacitor between the first detection electrodes TDL and the drive electrodes COML (refer to FIG. 15). Because the light transmittance of the part provided with the dummy electrodes TDD is substantially equal to that of the part provided with the first portions TDLa and the second portions TDLb, the first detection electrodes TDL can be made invisible. The slits SLd may be provided at the intersections of the thin wire pieces Ud1 and Ud2.

As illustrated in FIG. 26, the frame wire 37 is provided near the display area 10a and extends in the second direction Dy. With this configuration, as illustrated in FIG. 27, a fringing electric field Ef may possibly be generated between the drive electrodes COML provided to the first substrate 21 and the frame wire 37. When a conductor, such as a finger, is in contact with or in proximity to the frame wire 37, the finger blocks the fringing electric field Ef, thereby changing the electrostatic capacitor. If the change in the electrostatic capacitor is output to the detector 40 via the frame wire 37, erroneous detection may possibly occur. While three frame wires 37 are arranged in parallel in FIG. 27, a larger number of frame wires 37 may be arranged depending on the number of first detection electrodes TDL.

The second portions TDLb according to the present embodiment function as shields that block the fringing electric field Ef between the drive electrodes COML and the frame wire 37. With this configuration, the present embodiment can reduce the fringing electric field Ef, thereby suppressing erroneous detection. The second portions TDLb function not only as shields but also as touch detection electrodes that detect a finger or the like being in contact with or in proximity to the second portions TDLb.

As illustrated in FIGS. 24 and 25, the second detection electrodes 23 according to the present embodiment are provided under the second portions TDLb of the first detection electrodes TDL. In other words, the second detection electrodes 23 are provided in the peripheral area SB positioned on the outer side of the valid detection area SA. Even though the second detection electrodes 23 are provided, this configuration can suppress reduction in the area of the valid detection area SA. As a result, the present embodiment can detect pressure while suppressing reduction in the touch detection sensitivity. By supplying the guard signals Vsg1 to the second portions TDLb in pressure detection, the present embodiment suppresses capacitive coupling between the conductor provided on the first detection electrodes TDL side and the second detection electrodes 23, thereby reducing stray capacitance.

Fourth Embodiment

Figure 28:
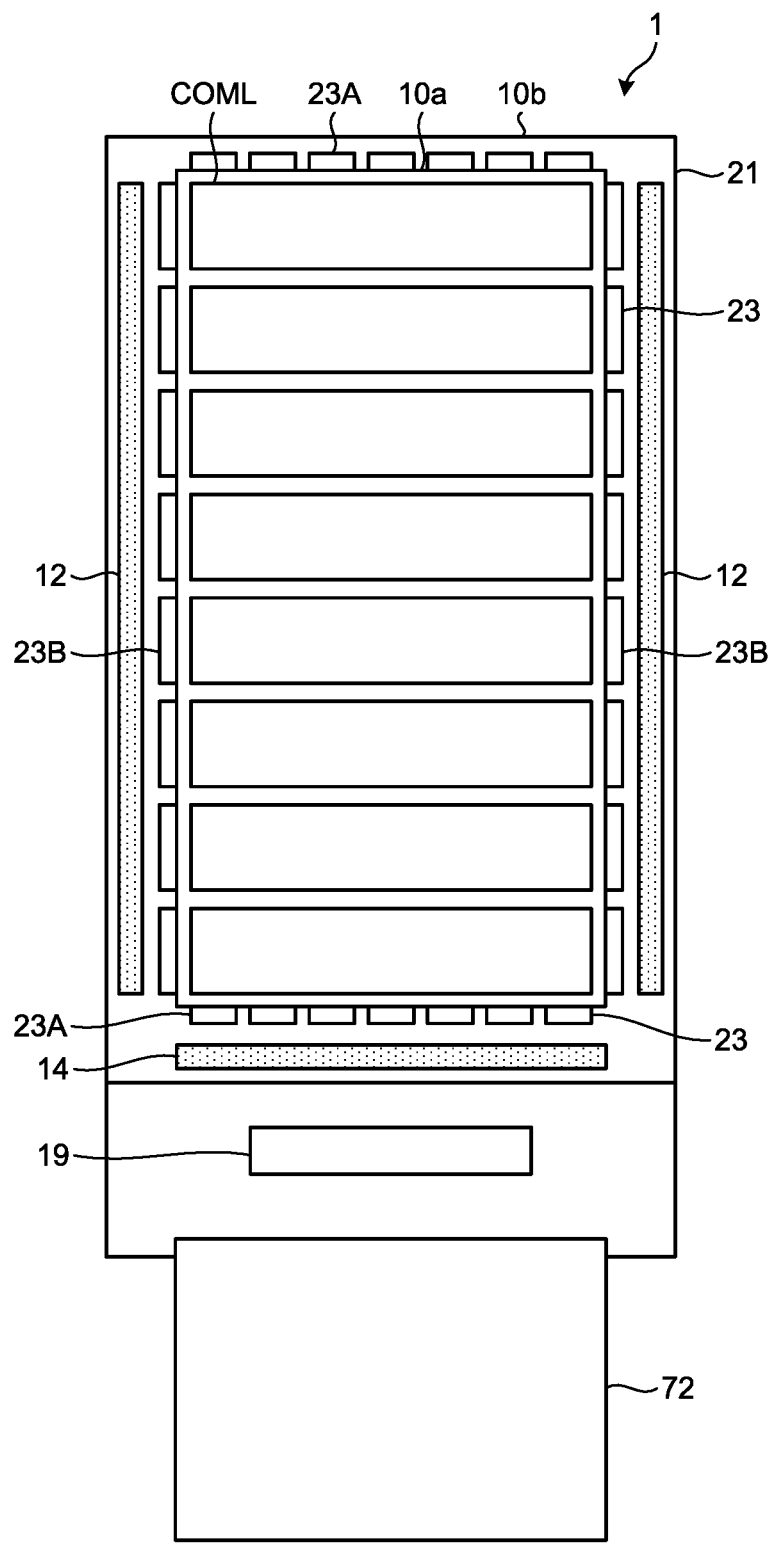
FIG. 28 is a plan view schematically illustrating the first substrate of the display device with a touch detection function according to a fourth embodiment.
Figure 29:
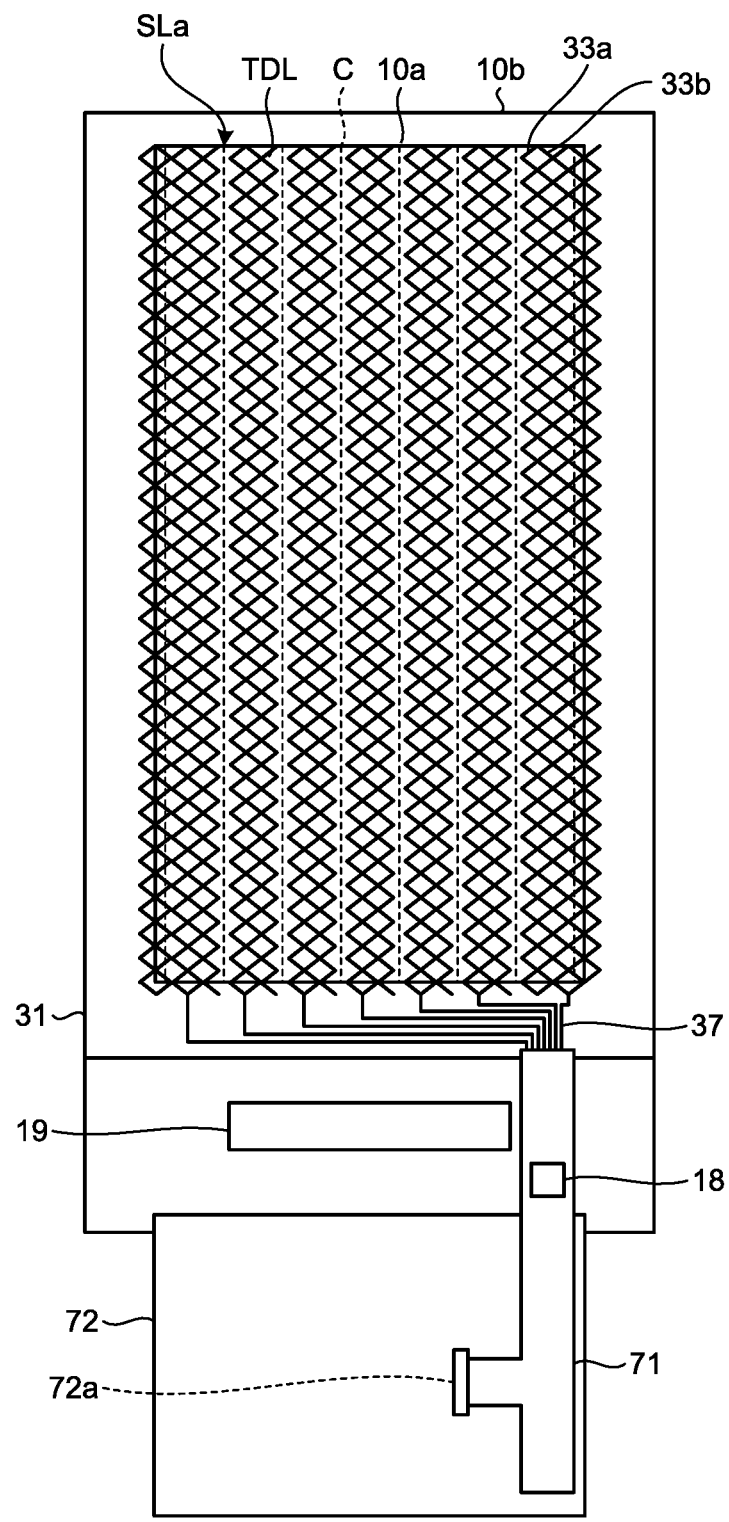
FIG. 29 is a plan view schematically illustrating the second substrate of the display device with a touch detection function according to the fourth embodiment.
Figure 30:
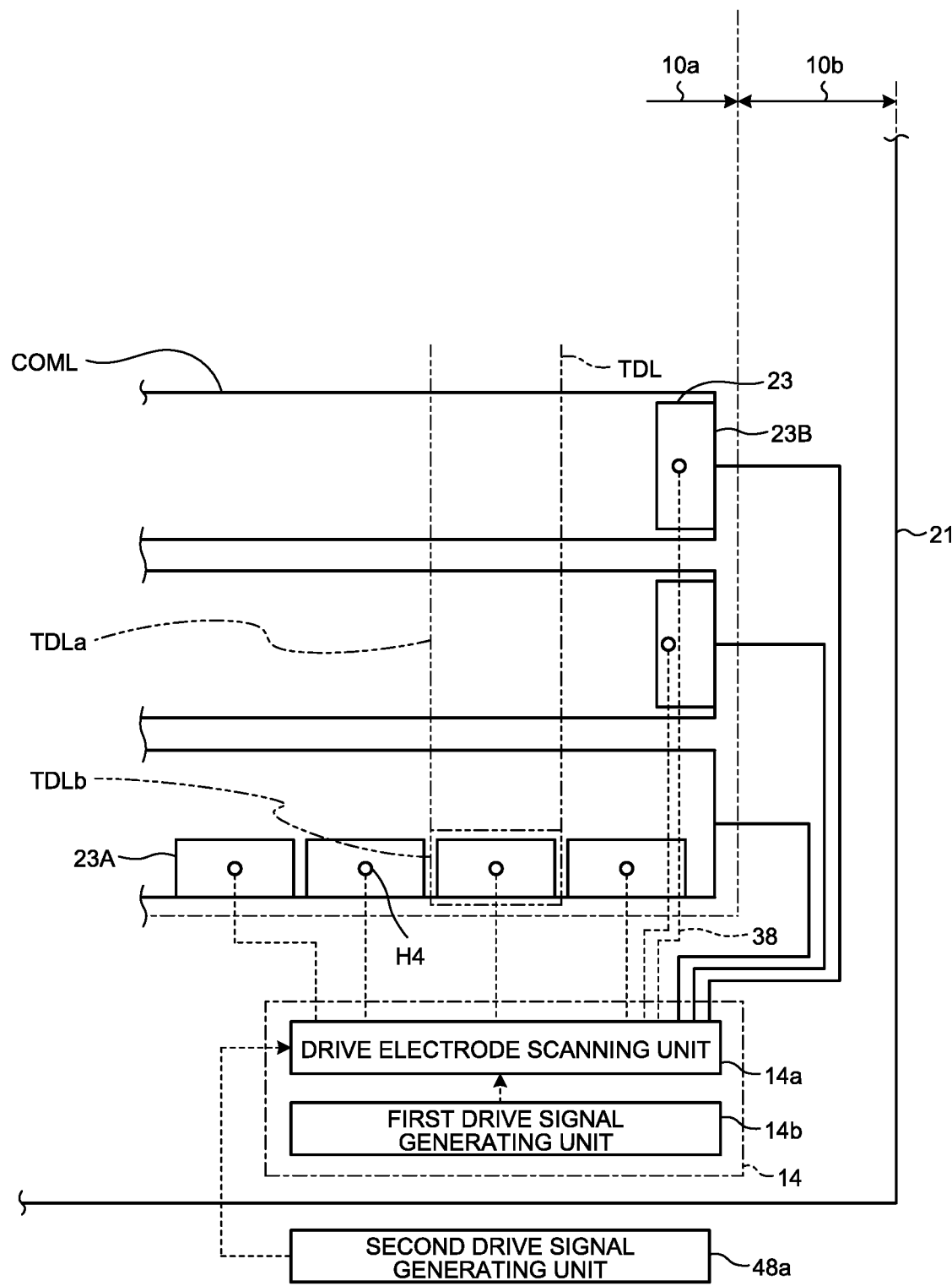
FIG. 30 is a schematic plan view illustrating the drive electrodes and the second detection electrodes according to the fourth embodiment in an enlarged manner.

FIG. 28 is a plan view schematically illustrating the first substrate of the display device with a touch detection function according to a fourth embodiment. FIG. 29 is a plan view schematically illustrating the second substrate of the display device with a touch detection function according to the fourth embodiment. FIG. 30 is a schematic plan view illustrating the drive electrodes and the second detection electrodes according to the fourth embodiment in an enlarged manner.

As illustrated in FIG. 28, the drive electrodes COML according to the present embodiment extend in a direction along the short side of the display area 10a and arrayed in a direction along the long side of the display area 10a. In other words, the drive electrodes COML extend in a direction along the extending direction of the scan signal lines GCL (refer to FIG. 17) and arrayed in a direction along the extending direction of the pixel signal lines SGL (refer to FIG. 17).

The second detection electrodes 23 according to the present embodiment are also arrayed in directions along the long side and the short side of the display area 10a. The second detection electrodes 23A are arrayed in the direction along the short side of the display area 10a, whereas the second detection electrodes 23B are arrayed in the direction along the long side of the display area 10a. The second detection electrodes 23A and 23B are arranged in a manner surrounding the display area 10a. The second detection electrodes 23A and 23B simply need to surround at least two sides of the display area 10a. The second detection electrodes 23A and 23B each have a rectangular shape. A plurality of second detection electrodes 23A are arrayed along one drive electrode COML. The length of the long side of the second detection electrode 23A is shorter than the length of the drive electrode COML in the extending direction.

In FIG. 28, the drive electrode driver 14 is provided on the short side of the frame area 10b near the display control IC 19. The arrangement of the drive electrode driver 14 is not limited thereto, and the drive electrode driver 14 may be provided on the long side of the frame area 10b.

As illustrated in FIG. 29, the first detection electrodes TDL are provided in the display area 10a of the second substrate 31. The first detection electrodes TDL each include a plurality of metal wires 33a and 33b. The metal wires 33a and 33b each have a plurality of bends and are formed into zigzag lines or wavy lines. The metal wires 33a and 33b extend in the direction along the long side of the display area 10a. The metal wires 33a and 33b are separated by slits SLa and the slits SLa are formed at positions indicated by the dotted lines C in FIG. 29. The metal wires 33a and 33b separated by the slits SLa function as one first detection electrode TDL.

The first detection electrodes TDL extend in the direction along the long side of the display area 10a and are arrayed in the direction along the short side of the display area 10a as a whole. The first detection electrodes TDL are coupled to the frame wire 37 at the end on the short side of the display area 10a and coupled to the touch detection IC 18 mounted on the flexible substrate 71.

The second detection electrodes 23A and 23B according to the present embodiment are also provided around the display area 10a, and they each detect pressure. With this configuration, the present embodiment can accurately detect the pressure. The second detection electrodes 23A are arrayed at least along the extending direction of the drive electrodes COML. With this configuration, the present embodiment can accurately detect pressure distribution in a direction along the extending direction of the drive electrodes COML. An input position is detected by the drive electrodes COML and the first detection electrodes TDL. Based on the information on the input position and the information on pressure, the present embodiment can calculate the pressure applied at one or a plurality of input positions.

The first detection electrodes TDL according to the present embodiment may also be arranged in a manner superimposed on the second detection electrodes 23A and 23B to function as a shielding layer in pressure detection. As illustrated in FIG. 30, the first detection electrodes TDL each have the first portion TDLa and the second portion TDLb. The first portion TDLa mainly functions as the detection electrode in touch detection, whereas the second portion TDLb functions as a shield that blocks the fringing electric field Ef. The second portions TDLb are arranged near the short side of the display area 10a, and the second detection electrodes 23A are provided at positions under the second portions TDLb. With this configuration, the present embodiment can detect pressure while suppressing reduction in the touch detection sensitivity.

As illustrated in FIG. 30, the second detection electrodes 23A and 23B are coupled to the coupling wire 38 through respective contact holes H4. The coupling wire 38 is coupled to the drive electrode scanning unit 14a. In this case, the pixel signal lines SGL (refer to FIG. 25) may also serve as the coupling wire 38. With this configuration, the present embodiment need not add another coupling wire 38, thereby suppressing an increase in the number of laminated layers.

While the preferred embodiments of the present invention have been described above, the present invention is not limited to the embodiments described above. The content disclosed in the embodiments is merely an example, and can be variously modified within the scope not departing from the gist of the present invention. Any modifications appropriately made within the scope not departing from the gist of the present invention naturally belong to the technical scope of the present invention.

The shape and the arrangement of the second detection electrodes 23, for example, may be appropriately changed. While the second detection electrodes 23 are provided in a manner surrounding four sides of the display area 10a, any of the four sides may be provided with no second detection electrode 23. While the first detection electrodes TDL is mesh-like wiring including a plurality of metal wires, the structure of the first detection electrodes TDL is not limited thereto. The first detection electrodes TDL may be made of a translucent electrically conductive material and have a rectangular shape, a strip shape, or other shapes similarly to the drive electrodes COML. While the touch panel 30 performs touch detection based on the basic principle of mutual capacitance touch detection, it may perform touch detection based on the basic principle of self-capacitance touch detection.

What is claimed is:

1. A detection device comprising:
    a substrate having
        pixel electrodes in a display area,
        first electrodes configured to detect contact or proximity of an object in a first period and overlapping the pixel electrodes in a plan view, and
        second electrodes configured to detect contact or proximity of an object in a second period different from the first period;
    a third electrode overlapping the first electrodes and the second electrodes in a plan view;
    a conductor overlapping the second electrodes in a plan view, the substrate being located between the conductor and the second electrodes; and
    a frame wire provided in a frame area positioned on an outer side of the display area and coupled to the third electrode,
wherein,
    in the second period, a drive signal is supplied to at least one of the second electrodes,
    the third electrode is disposed in a layer different from a layer of the second electrodes; overlaps the second electrodes in a vertical direction perpendicular to a main surface of the substrate, and is supplied with a guard signal that has a waveform synchronized with the drive signal in the second period,
    the third electrode is disposed in the display area and has a first portion provided at a center of the display area and a second portion, and
    in the vertical direction, (a) the conductor, (b) the second electrodes which are located along an edge of the display area and at least one of which are supplied with the drive signal in the second period, and (c) the second portion that is provided between the first portion and the frame wire along the edge of the display area and that is supplied with the guard signal having the waveform synchronized with the drive signal in the second period, are stacked in this order.

2. The detection device according to claim 1, wherein the second electrodes are located in the display area.

3. The detection device according to claim 1, wherein the second electrodes are located outside the display area.

4. The detection device according to claim 1, wherein the second electrodes are located along at least two sides of the display area.

5. The detection device according to claim 1, wherein the contact or the proximity is detected:
    in the first period, on a basis of an electrostatic capacitor between the first electrodes and the third electrode; and
    in the second period, on a basis of an electrostatic capacitor between the second electrodes and the conductor.

6. The detection device according to claim 5, wherein the first electrodes and the third electrode do not detect the contact or the proximity in the second period.

7. The detection device according to claim 1, wherein the second electrodes are located at a same layer as a layer of the pixel electrodes.

8. The detection device according to claim 1, wherein the pixel electrodes are located at an opposite side of the second electrodes from the substrate.

9. The detection device according to claim 1, wherein the first electrodes are located at an opposite side of the second electrodes from the substrate.

10. The detection device according to claim 1, wherein the third electrode is supplied with a voltage having a fixed potential in the first period.

11. The detection device according to claim 1, wherein the drive signal is sequentially supplied to the second electrodes in the second period.

12. The detection device according to claim 1, further comprising a display panel with the substrate,
    wherein, in a display operation period:
        an image is displayed on a surface of the display panel;
        each of the pixel electrodes is supplied with a corresponding video image signal of the video image signals; and
        the first electrodes are supplied with a common voltage.

13. The detection device according to claim 12, wherein a position of the object being in contact with or in proximity to the surface is detected in at least one of the first period and the second period.

14. The detection device according to claim 12, wherein pressure applied on the surface by the object is detected in the second period.

15. The detection device according to claim 12, wherein
the first period comprises a plurality of first periods,
the second period comprises a plurality of second periods,
the display operation period comprises a plurality of display operation periods, and
one frame period of the display panel includes the first periods, the second periods, and the display operation periods.

16. A detection device comprising:
first electrodes in a first layer;
second electrodes in a second layer different from the first layer;
a third electrode overlapping the first and second electrodes in a plan view;
a conductor overlapping the second electrodes in a plan view and located at an opposite side of the second electrodes from the third electrodes; and
a frame wire provided in a frame area positioned on an outer side of a display area and coupled to the third electrode,
wherein:
in a first period, the first electrodes and the third electrode detect contact or proximity of an object; and
in a second period, the second electrodes and the conductor detect contact or proximity of an object and a drive signal is supplied to at least one of the second electrodes, and
the third electrode is disposed in a layer different from a layer of the second electrodes, overlaps the second electrodes in a vertical direction perpendicular to a main surface of the substrate, and is supplied with a guard signal that has a waveform synchronized with the drive signal in the second period,
the third electrode is disposed in the display area and has a first portion provided at a center of the display area and a second portion, and
in the vertical direction, (a) the conductor, (b) the second electrodes which are located along an edge of the display area and at least one of which are supplied with the drive signal in the second period, and (c) the second portion that is provided between the first portion and the frame wire along the edge of the display area and that is supplied with the guard signal having the waveform synchronized with the drive signal in the second period, are stacked in this order.

17. The detection device according to claim 16, wherein,
in the first period, the contact or the proximity is detected on a basis of an electrostatic capacitor between the first electrodes and the third electrode; and
in the second period, the contact or the proximity is detected on a basis of an electrostatic capacitor between the second electrodes and the conductor, and the first electrodes and the third electrode do not detect the contact or the proximity.

18. The detection device according to claim 16, wherein,
in the first period, a position of the object being in contact with or in proximity to a main surface of the detection device is detected; and
in the second period, pressure applied on a main surface of the detection device by the object is detected.

19. The detection device according to claim 16, wherein the third electrode is supplied with a voltage having a fixed potential in the first period.

* * * * *